(12) United States Patent
Paone

(10) Patent No.: US 6,259,789 B1
(45) Date of Patent: Jul. 10, 2001

(54) COMPUTER IMPLEMENTED SECRET OBJECT KEY BLOCK CIPHER ENCRYPTION AND DIGITAL SIGNATURE DEVICE AND METHOD

(75) Inventor: Luciano F. Paone, Kings Park, NY (US)

(73) Assignee: Safecourier Software, Inc., Kings Park, NY (US)

( * ) Notice: Subject to any disclaimer, the term of this patent is extended or adjusted under 35 U.S.C. 154(b) by 0 days.

(21) Appl. No.: 08/989,261

(22) Filed: Dec. 12, 1997

(51) Int. Cl.$^7$ ............................... H04L 9/00; H04K 1/00
(52) U.S. Cl. ............................... 380/28; 380/30; 713/189
(58) Field of Search .................... 380/4, 21, 25, 380/28, 30; 713/189

(56) References Cited

U.S. PATENT DOCUMENTS

| | | |
|---|---|---|
| 3,798,360 | 3/1974 | Feistel . |
| 3,958,081 | 5/1976 | Ehrsam . |
| 4,369,332 * | 1/1983 | Campbell, Jr. ..................... 380/43 |
| 4,488,001 * | 12/1984 | Cooley et al. ...................... 380/4 |
| 5,003,596 * | 3/1991 | Wood ................................ 380/28 |
| 5,369,702 * | 11/1994 | Shanton ............................. 380/4 |
| 5,400,403 | 3/1995 | Fahn et al. . |
| 5,442,705 | 8/1995 | Miyano . |
| 5,454,039 * | 9/1995 | Coppersmith et al. ............. 380/28 |
| 5,594,869 | 1/1997 | Hawe et al. . |
| 5,625,690 | 4/1997 | Michel et al. . |
| 5,631,961 * | 5/1997 | Mills et al. ........................ 380/21 |
| 5,647,000 * | 7/1997 | Leighton .......................... 380/30 |
| 5,675,652 * | 10/1997 | Coppersmith et al. ............. 380/28 |
| 5,675,653 * | 10/1997 | Nelson, Jr. ........................ 380/28 |
| 5,677,952 * | 10/1997 | Blakely, III et al. ................ 380/4 |
| 5,724,428 * | 3/1998 | Rivest .............................. 380/37 |
| 5,764,772 * | 6/1998 | Kaufman et al. .................. 380/30 |
| 5,841,872 * | 11/1998 | Colvin, Sr. ........................ 380/28 |
| 5,933,503 * | 8/1999 | Schell et al. ...................... 380/25 |
| 5,949,884 * | 9/1999 | Adams et al. ..................... 380/29 |
| 5,995,623 * | 11/1999 | Kawano et al. .................. 713/189 |
| 6,069,954 * | 5/2000 | Moreau ............................. 380/28 |

FOREIGN PATENT DOCUMENTS

09093242A * 4/1997 (JP) .

OTHER PUBLICATIONS

Alfred J. Menezes, "Handbook of Applied Cryptography", text book, pp.: 20–21, 170, 252, 255–256, 321–322, 325, 389–399, 426–429, 490–491, 1997.*

* cited by examiner

Primary Examiner—Tod Swann
Assistant Examiner—Stephen Kabakoff
(74) Attorney, Agent, or Firm—Hoffmann & Baron, LLP

(57) ABSTRACT

A computer implemented method and device for creating object keys to be used with a 4096-bit secret key block cipher data encryption process and a 2048-bit secret key digital signature process. The object keys are dynamic keys, i.e., changing throughout the encryption process. The dynamic object keys are composed of a static initial state that is created by the user and a method that modifies the keys based on seeding from a random session key object. The object key modification is performed for each plaintext data block so that each data block is encrypted using a different key. The initial state of the object key is also used in a block cipher encryption process to encrypt a 512-bit random session key. Data blocks of 64 bytes each are encrypted utilizing a different key, provided by the object key, for each block. The ciphertext (encrypted file) is transmitted into a keyed hashed function that utilizes a 2048-bit object key to produce a unique 2048-bit digital signature that is appended to the ciphertext. The digital signature object key is seeded with the input data. Decryption is accomplished by reversing the encryption process.

34 Claims, 25 Drawing Sheets

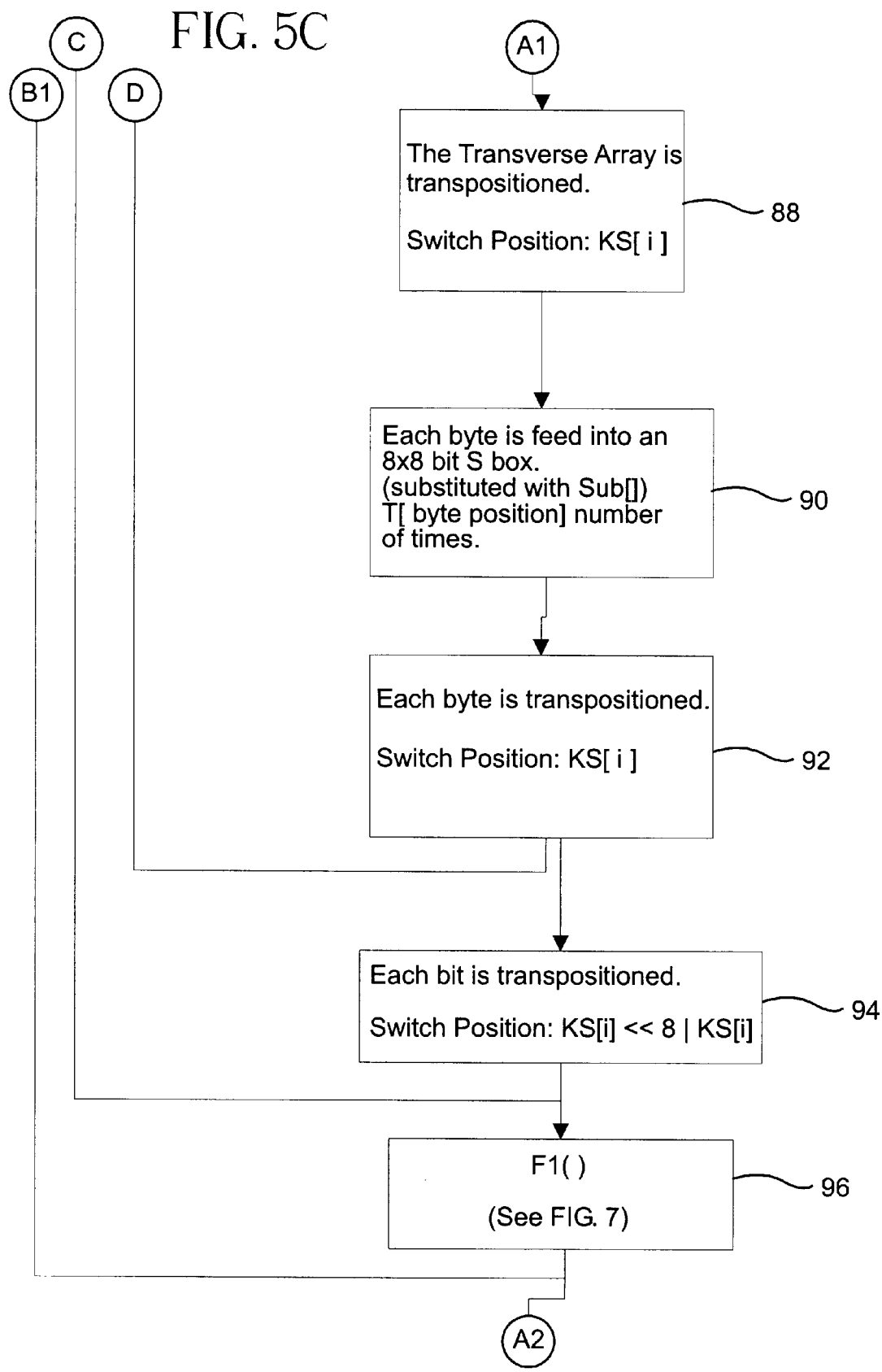

~ - append
IKS - Initial state of KS
SWK - Switch Key
| - OR

FIG. 7A
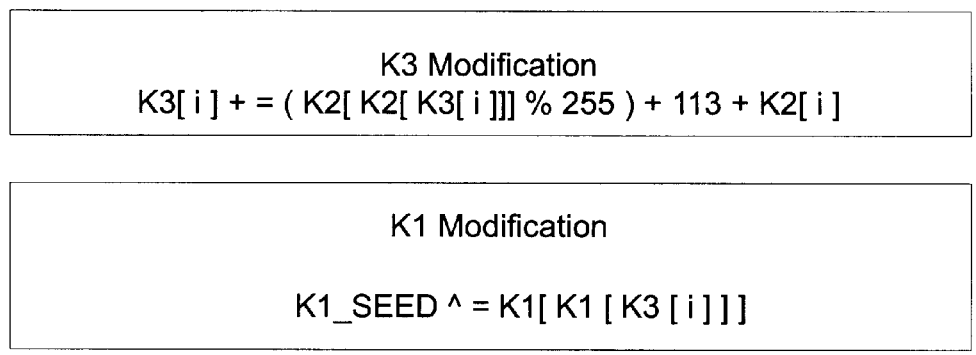
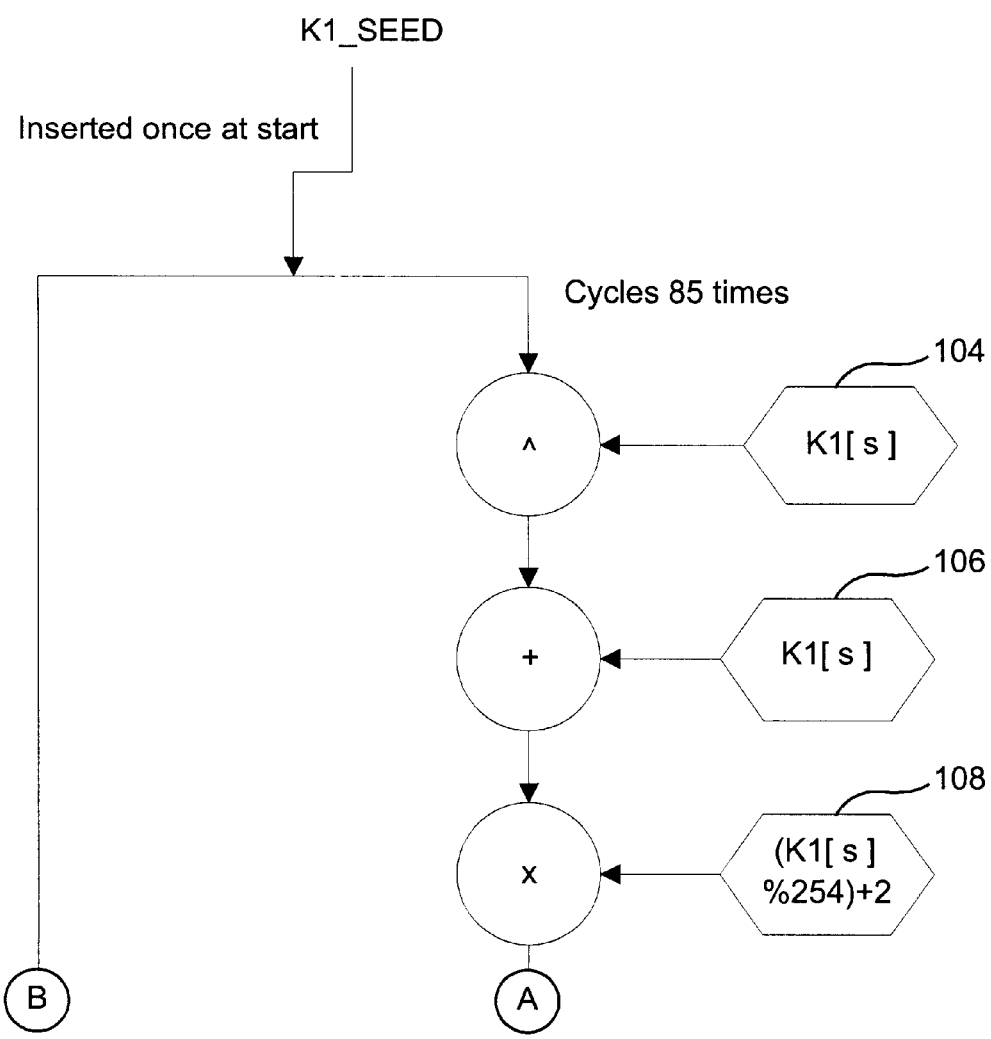

HASH(hnum,output,v1,v2,v3,v4,v5,v6,v7,key) = (output +=
key+hnum(v1,v2,v3,v4,v5,v6,v7)

HASH_FOR_KEY(hnum,result,output,v1,v2,v3,v4,v5,v6,v7,key) =
(result+=output+key+hnum(v1,v2,v3,v4,v5,v6,v7))

FIG. 11C

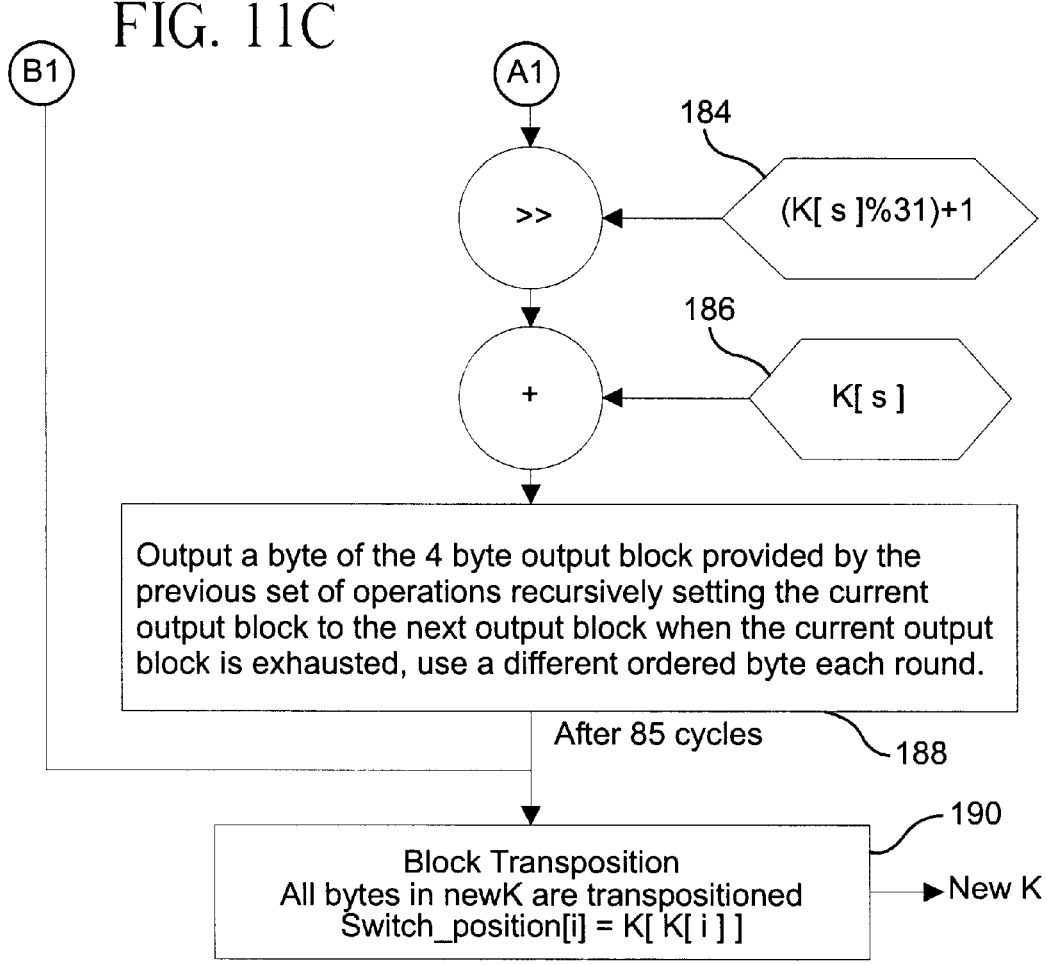

input_block = 256 bytes of input, read from the input file.

var0 = 32 bit pointer assigned to input_block;
var1 = 32 bit pointer assigned to (input_block+32);
var2 = 32 bit pointer assigned to (input_block+64);
var3 = 32 bit pointer assigned to (input_block+96);
var4 = 32 bit pointer assigned to (input_block+128);
var5 = 32 bit pointer assigned to (input_block+160);
var6 = 32 bit pointer assigned to (input_block+192);
var7 = 32 bit pointer assigned to (input_block+224);

\# - static numbers
index++ - running index
rep - running index for(rep=0;pep<8;rep++){}  - Code within "{}" will be executed eight times and rep will be incremented after each loop.

FIG. 12A

```
F3_SEED = ((((K[(HASH_FOR_KEY(H1,o,K[#],K[#],K[#],K[#],K[#],K[#],K[#],
   K[#],K[(s)]))%64])>>(HASH_FOR_KEY(H2,o,K[#],K[#],K[#],K[#],K[#],
   K[o%64],K[#],K[#],K[(s)]))%25));

F3(F3_SEED)

F3_SEED = ((((K[(HASH_FOR_KEY(H1,o,K[#],K[#],K[#],K[o%64],K[#],K[#],
   K[#],K[#],K[(s)]))%64])>>(HASH_FOR_KEY(H2,o,K[#],K[o%64],K[#],K[#],
   K[#],K[#],K[#],K[#],K[(s)]))%25));

F3(F3_SEED)

F3_SEED = ((((K[(HASH_FOR_KEY(H1,o,K[o%64],K[#],K[#],K[#],K[#],K[#],
   K[#],K[#],K[(s)]))%64])>>(HASH_FOR_KEY(H2,o,K[#],K[#],K[#],K[#],
   K[o%64],K[#],K[#],K[#],K[(s)]))%25));

F3(F3_SEED)
```

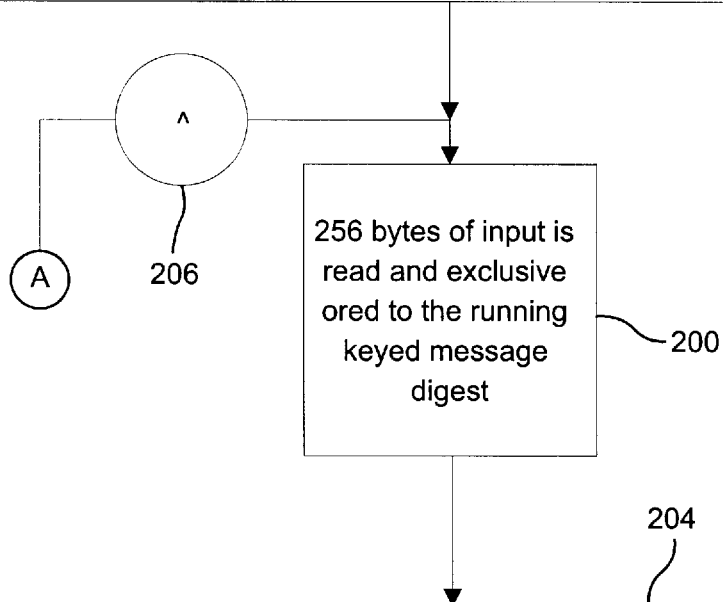

(A) ∧ 206

256 bytes of input is read and exclusive ored to the running keyed message digest — 200

204

```
F3_SEED = ((((K[(HASH_FOR_KEY(H7,o,var3[6],var4[6],var5[6],var1[6],
   var0[6],var7[6],var6[6],var2[6],K[(index++%64)]))%64])>>
   (HASH_FOR_KEY(H8,o,var2[7],var6[7],var4[7],var5[7],var3[7],var1[7],
   var0[7],var7[7],K[(index++%64)]))%25));

F3( F3_SEED )
```

(B)

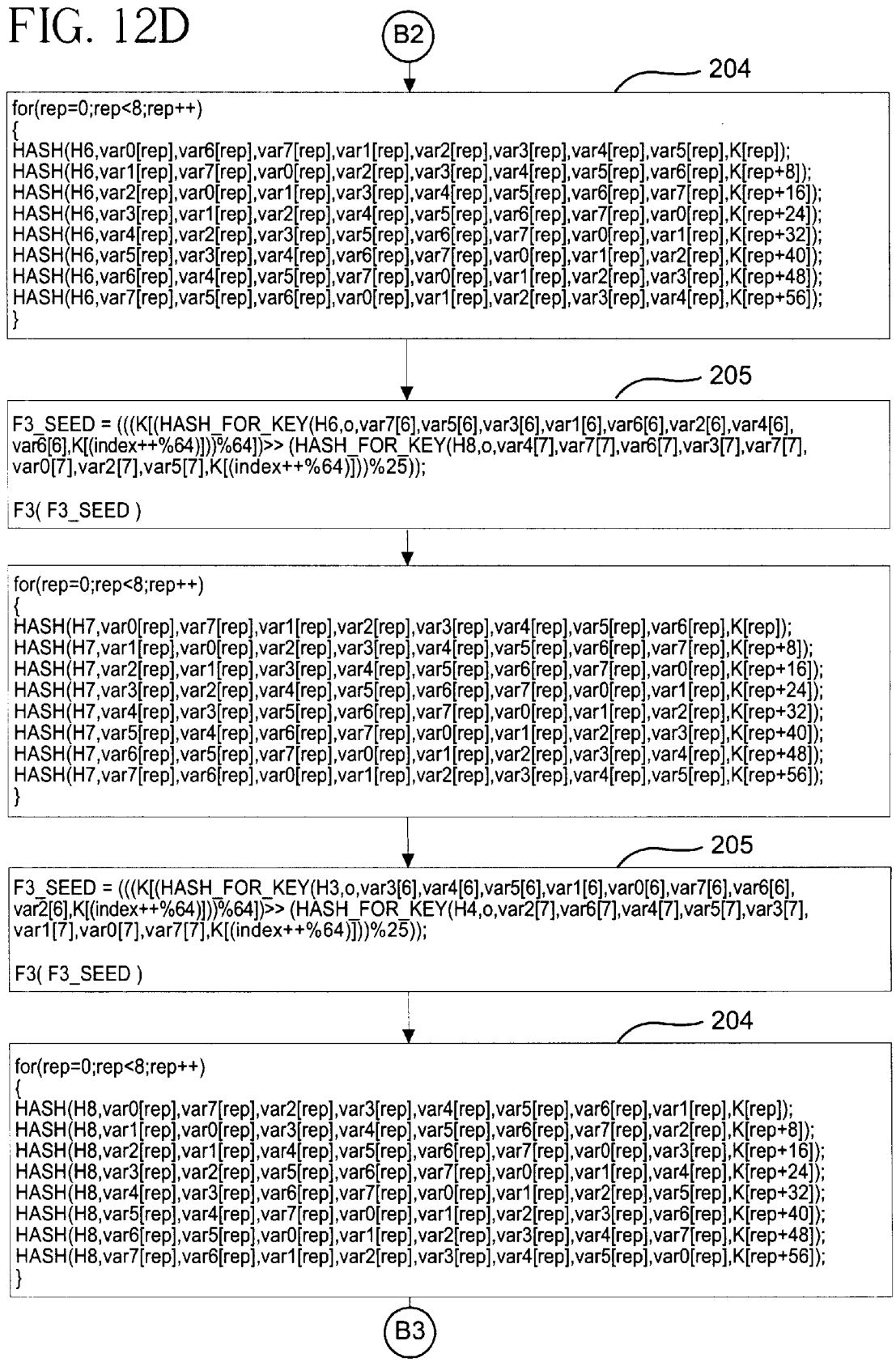

COMPUTER IMPLEMENTED SECRET OBJECT KEY BLOCK CIPHER ENCRYPTION AND DIGITAL SIGNATURE DEVICE AND METHOD

COPYRIGHT NOTICE

A portion of the disclosure of this patent document contains material which is subject to copyright protection. The copyright owner has no objections to the reproduction by anyone of the patent disclosure as it appears in the United States Patent and Trademark Office records, but otherwise reserves all copyright rights whatsoever.

BACKGROUND OF THE INVENTION

1. Field of the Invention

This invention relates generally to a computer implemented device and method for cryptography and, more particularly relates to a computer implemented block cipher encryption method utilizing dynamic device keys and a digital signature.

2. Description of the Prior Art

The principal goal of encryption is to render communicated data secure from unauthorized eavesdropping. This is generally referred to as the "secrecy" or "confidentiality" requirement of cryptographic systems. A related requirement is the "authenticity" or "integrity" requirement, which ensures that the communicated information is authentic, i.e. that it has not been tampered with, either deliberately or inadvertently. For purposes of further discussion, some definitions are provided.

"Plaintext" is used to refer to a message before encrypting and after decrypting by a cryptographic system. "Ciphertext" is the form that the encrypted part of the message takes during transmission over a communications channel or within a computer memory storage device. "Encryption" is the process of transformation from plaintext to ciphertext. "Decryption" is the process of transformation from ciphertext to plaintext. Both encryption and decryption are controlled by keys. Without knowledge of the encryption key, a message cannot be encrypted, even with knowledge of the encrypting process. Similarly, without knowledge of the decryption key, the message cannot be decrypted, even with knowledge of the decrypting process.

Data encryption processes scramble plaintext data into ciphertext to prevent unauthorized access to the data. Decryption processes restore the plaintext from the ciphertext (encrypted data). Symmetric key encryption processes utilize the same key for encryption and decryption.

In order to ensure the integrity of the ciphertext, the encryption must be sufficiently complex to prevent unauthorized access to the encrypted data. Two current methods of cryptanalytic attacks, methods designed to break encryption processes, are linear and differential cryptanalysis. In linear cryptanalysis, linear approximations of the block cipher and key schedule used in the encryption process are constructed. Collected plaintexts and associated ciphertexts are used to exploit a bias in the encryption process and key schedule.

If the bias is very small many plaintexts and associated ciphertext pairs are used. This method tries different keys and eventually converges on the correct key. In differential cryptanalysis, pairs of ciphertexts whose plaintexts have particular differences are compared. The evolution of these differences as the plaintexts propagate through the rounds of the encryption process when they are encrypted with the same key are analyzed. Different probabilities are assigned to different keys. As more and more ciphertext pairs are analyzed, the method converges on the correct key. Both cryptanalytic attacks exploit the fact that existing symmetric key block cipher encryption processes use static keys to create the ciphertext.

Still other cryptanalytic attacks exploit the fact that current encryption processes use small key spaces and small block sizes. For certain key spaces and block sizes, current data storage technologies now make it possible to store all combinations of an encrypted block with an associated key for a chosen plaintext block. Thus, breaking the encryption process merely involves a quick look-up table. Accordingly, the present invention seeks to overcome the disadvantages associated with currently available encryption methods and create ciphertext which is very secure and substantially immune to known cryptanalytic attacks.

OBJECTS AND SUMMARY OF THE INVENTION

It is an object of the present invention to provide a computer implemented encryption device and method which is substantially immune to currently available cryptanalytic attacks using an object key comprised of data and methods which operate on the data.

It is another object of the present invention to provide a computer implemented block cipher encryption device and method using an object key which is dynamic, i.e., changing throughout the encryption process.

It is still a further object of the present invention to provide a computer implemented block cipher encryption device and method using a dynamic object key which is modified by a random session object key.

It is yet another object of the present invention to provide a computer implemented block cipher encryption device and method such that each input plaintext data block is encrypted using a new key schedule to create the ciphertext.

It is a further object of the present invention to provide a computer implemented encryption device and method which includes a digital signature appended to the ciphertext, the digital signature being unique to the data being signed.

It is yet another object of the present invention to provide a computer implemented encryption device and method using a secret key composed of two 2048-bit user object keys and 512-bit random session object key.

The present invention provides a computer implemented data encryption device and method utilizing object keys (consisting of data and methods that operate on the data), a large key space and a large block size. The object keys (K_OBJECT) are dynamic keys and are composed of a 4096-bit static initial state that is created by the user and a method that modifies the keys based on seeding from a random session object key (R_OBJECT). The key modification is performed for each input plaintext data block so that each data block is encrypted with a different key. The initial state of the object key is used in the block cipher encryption process to encrypt a 512-bit random session key. The random session object key is used as the initial state of the random session object key (R_OBJECT). The running states of the random session object key (R_OBJECT) seed the object key (K_OBJECT) modification methods. The object key's (K_OBJECT) running state provides an index for seeding of the random session object key's (R_OBJECT) modification method. The encryption process utilizes a 512-bit (64 byte) input block size.

The object key (K_OBJECT) is preferably composed of two 2048-bit sub-object keys (K1 and K2). The two sub-object keys are used as inputs to an expansion function that provides 13584 bytes for the block's key schedule. Similar to the object key (K_OBJECT), the block's key schedule is regenerated anew for each plaintext input block.

The encryption process includes many linear and nonlinear-keyed operations. The keyed operations include addition, 32-bit sliding window rotation, bit-wise exclusive or, 8-bit by 8-bit substitution using different transverse counts for each substitution, byte transposition and bit transposition. All operations are nested and repeated multiple times.

The decryption process is identical to the encryption process with the exception that the keyed encryption operations on the data are run in reverse.

In order to authenticate an encrypted file, a digital signature is provided. To create the digital signature, the ciphertext is used as input into a 2048-bit object keyed one-way hash function to produce a 2048-bit digital signature that is appended to the ciphertext. The 2048-bit digital signature object key is seeded with the output of hash rounds. A third party or secured server can execute verification software that contains the user's secret digital signature key to regenerate the digital signature of the ciphertext that was signed and compare it to the signature that is appended to the ciphertext to determine if they match. The plaintext is not compromised and only the party that contains the receiver's encryption key can create ciphertext that the receiver can decrypt into plaintext.

A preferred form of the encryption device and method, as well as other embodiments, objects, features and advantages of this invention will be apparent from the following detailed description of illustrative embodiments thereof, which is to be read in connection with the accompanying drawings.

BRIEF DESCRIPTION OF THE DRAWINGS

FIG. 10 is a flow chart representation of the method to create a digital signature for each encrypted file formed in accordance with the present invention.

DETAILED DESCRIPTION OF THE PREFERRED EMBODIMENTS

Figure 1:
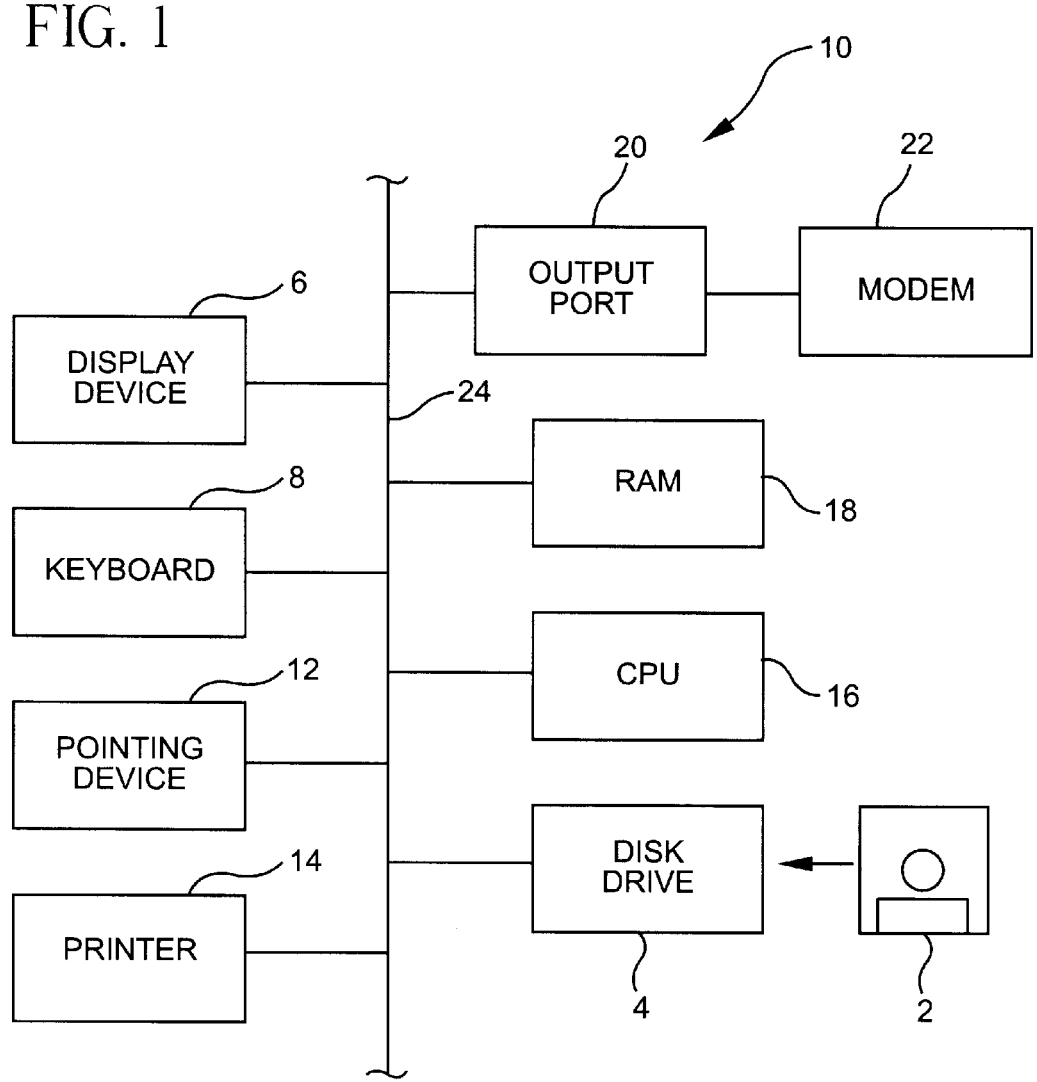
FIG. 1 is a simplified block diagram of a computer based system capable of implementing the encryption method of the present invention.

Referring initially to FIG. 1, a simplified block diagram of a computer based system 10 used for implementing the encryption method of the present invention is illustrated. In general, the encryption method of the present invention may be implemented in software and embodied on a magnetic storage device 2 such as a computer diskette. The diskette may be inserted and into and read by a disk drive 4 for execution by the computer system 10. The computer system 10 generally includes a display device 6, such as a CRT display, a keyboard 8 for entering information, a pointing device 12, and a printer 14. Internally, the computer system 10 includes a central processing unit (CPU) 16 which preferably includes an internal clock function, a memory device, such as a random access memory (RAM) and an output port which may be connected to a modem for remote access to other computer systems within a network. The various computer system components are operatively coupled and communicate via a system bus 24, or similar hardware architecture.

It will be appreciated by those of ordinary skill in the art that the computer system illustrated in FIG. 1 is merely representative of one form of computer based system capable of carrying out the functions of the encryption method of the present invention. For example, the encryption method may be executed on a single computer workstation to protect information stored therein or in a cryptographic communications system including a plurality of computer stations cooperatively coupled and operating via a computer network to protect information being transmitted and received via the network.

Further, it is to be understood that the individual system components may vary in type, while still providing similar functions. For example, the pointing device 12, used to position a display cursor and select certain functions and/or items displayed on the display device may be in the form of a mouse, trackball or touchscreen. In a preferred embodiment, the user is provided with a keyboard 8 for data entry and key initialization and a mouse as the pointing device 12.

Regardless of the computer system being used, the encryption method of the present invention may be loaded from the diskette into the disk drive 4 and executed by the CPU 16 in conjunction with the RAM 18. In this manner, the functions of the encryption method can be executed to create ciphertext (encrypted data) from input plaintext, or to decrypt ciphertext to restore the input plaintext.

Figure 2:
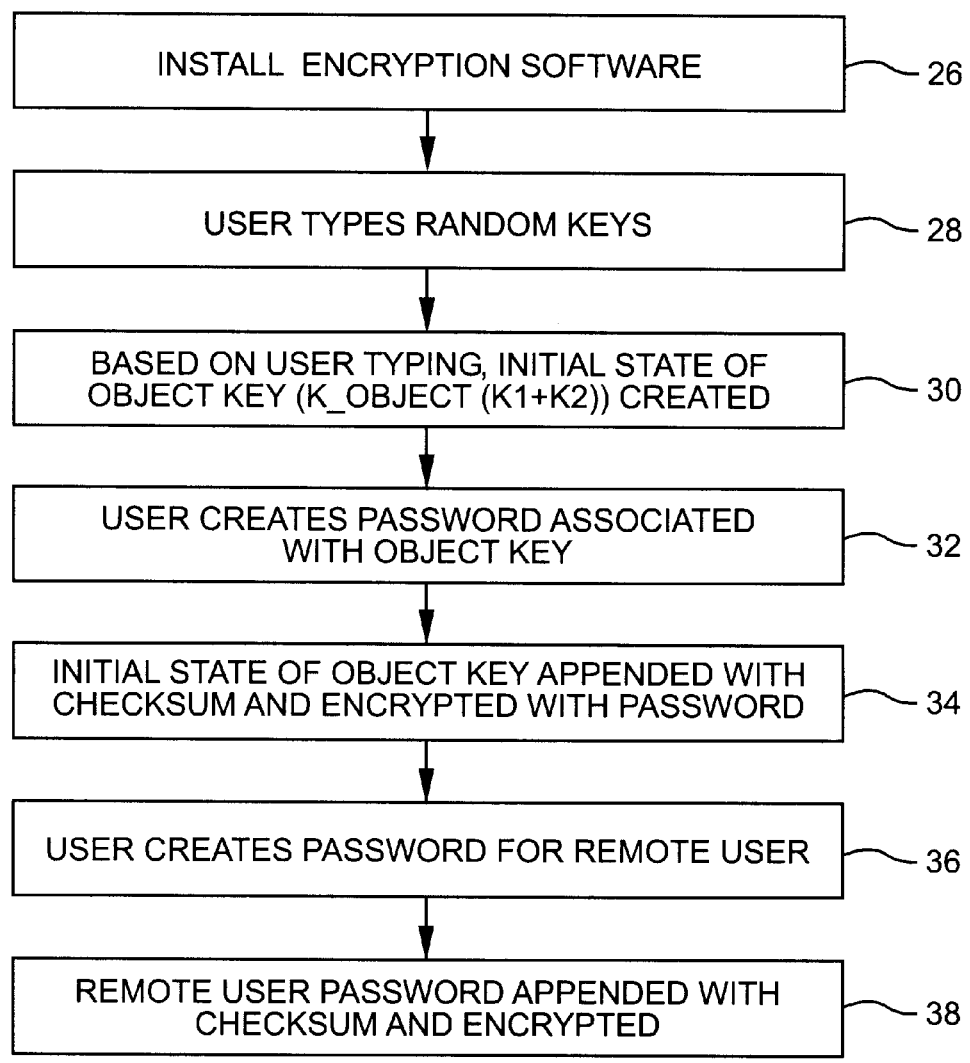
FIG. 2 is a simplified flow chart representation of the installation and initialization of the encryption software onto a computer based system of FIG. 1.
Figure 3:
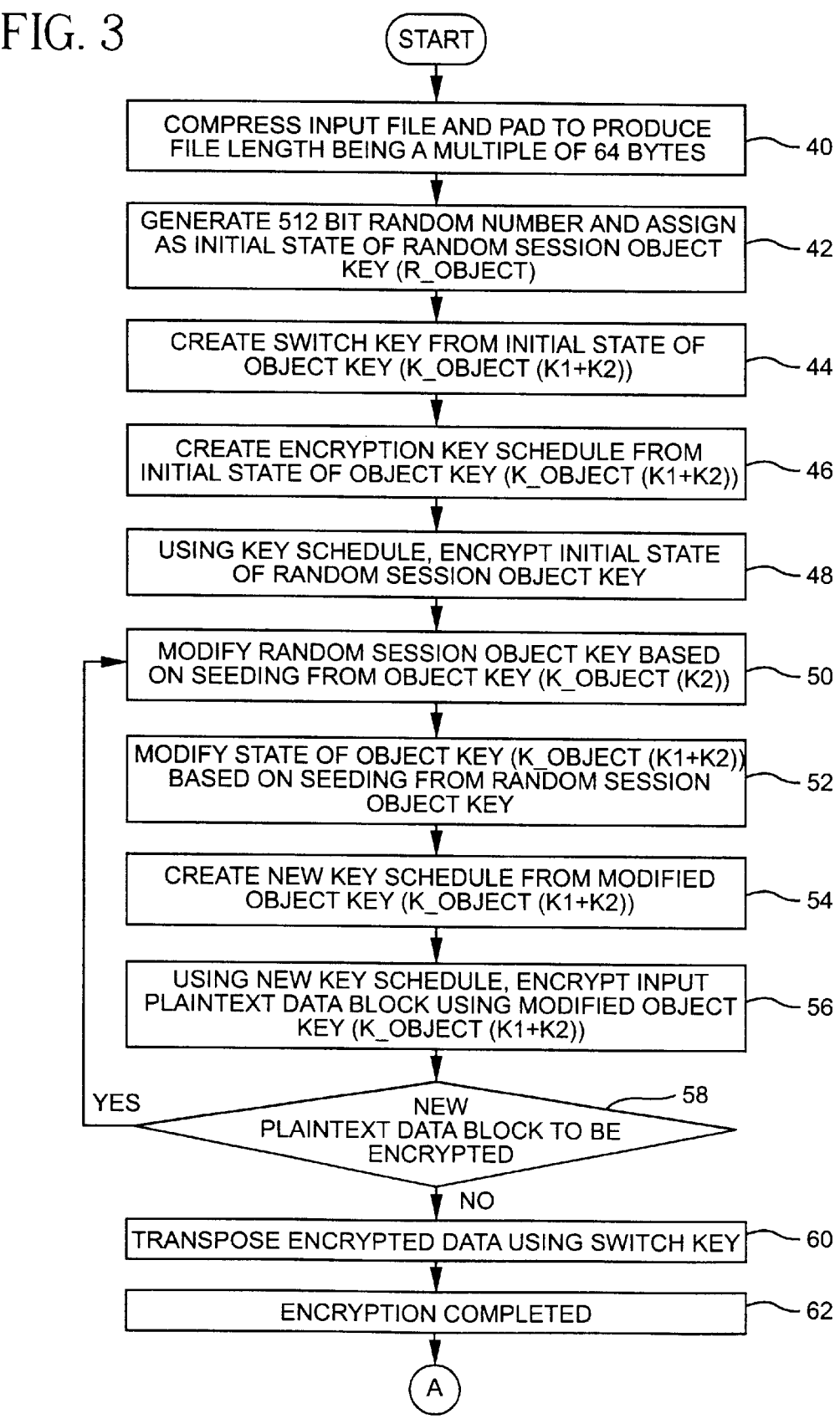
FIG. 3 is a simplified flow chart representation of the encryption process performed by the computer system formed in accordance with the present invention.

Referring now to FIG. 2, the installation and initialization of the encryption method is illustrated in flow chart format. The encryption software is initially installed 26 into the disk drive 4 and executed by the CPU 16 and RAM 18. Once installed, the user types a series of random key strokes 28. Based upon the random keystrokes, an initial state of the object key (K_OBJECT comprising sub-object key K1 and sub-object key K2) is created 30. At this point, the user creates a password 32 which becomes associated or linked with the initial state of the object key. The initial state of the object key is appended with a checksum and encrypted 34 along with the user's password. The user then creates a password for a remote user 36 to allow decryption of transmitted ciphertext. The remote user password is also appended with a checksum and encrypted 38. With this initialization procedure completed, the user is ready to create ciphertext from plaintext data using the encryption method of the present invention.

The computer implemented encryption device and method of the present invention utilizes object keys, consisting of data and methods that operate on the data, a large key space and a large block size. More specifically, the present invention discloses a 4096-bit secret object key block cipher encryption method utilizing a 2048-bit object keyed digital signature process to sign encrypted files. In the object key, the data comprises a set of binary digits that can represent two to the power of the bit length possible combinations. The encryption method uses a 512-bit block and the object key is a dynamic key. The object key (K_OBJECT) contains key modification methods that mutate the key's state based on seeding from a random session object key (R_OBJECT). The random session object key also consists of data and methods that operate on the data. As illustrated in FIG. 1, the user of the encryption method creates the object key's 4096-bit initial state.

In order to create an encrypted file, the input plaintext file is compressed using a redundant byte reducing method and padded with random bytes to produce a file with a length being a multiple of 512-bits (64 bytes) 40. Using a time clock which is a part of the computer system CPU, a 512-bit random number is generated and assigned as an initial state of the random session object key (R_OBJECT) 42.

Next, a switch key is created 44, from an initial state of the object key (K_OBJECT comprising K1 and K2). The function of the switch key will be discussed later in further detail. In the block cipher encryption method in accordance with the present invention, the plaintext blocks are encrypted using a dynamic key schedule. The encryption key schedule is created 46 from an initial state of the object key (K_OBJECT comprising K1 and K2). As will become apparent, the encryption method of the present invention encrypts each plaintext data block utilizing a different key schedule to produce ciphertext that is immune to current cryptanalytic attacks designed to work with static key schedules.

Using the initial state of the key schedule, the initial state of the random session object key is encrypted 48. At this point in the encryption method of the present invention, the random session object key is modified 50 based on seeding from the object key (K_OBJECT using K2 only). This modification of the random session object key is the first step within a logic loop to determine when the entire plaintext file has been transformed into ciphertext. In the next step, the state of the object key (K_OBJECT comprising K1 and K2) is modified based on seeding from the random session object key 52. Using the modified object key from the previous step, a new key schedule is created 54. The new key schedule is utilized to encrypt the input plaintext data block using the modified object key (K_OBJECT comprising K1 and K2) 56. At this point, the encryption method includes a decision box to determine if further plaintext data blocks exist to be encrypted 58. If further plaintext data blocks exist, the method returns to the step in which the random session object key is modified based on seeding from (K_OBJECT using K2 only) 50. Accordingly, new states for the random session object key (step 50), the object key (K_OBJECT comprising K1 and K2) (step 52), and a new key schedule (step 54) are created for each plaintext data block which is encrypted. Once all plaintext data blocks are encrypted, the encryption method of the present invention transposes 60 the encrypted data using the switch key created in step 44. More specifically, a final 128 byte transposition is performed on the encrypted data with the first 128 bytes of ciphertext transpositioned within the entire ciphertext file with respect to the switch key. After transposition, the encryption is completed 62.

In the preferred embodiment of the present invention, a digital signature is produced and appended to the ciphertext. A digital signature allows a third party or secured server to execute verification software that contains the original user's secret digital signature key to regenerate the digital signature of the ciphertext and compare it to the signature that was appended to the encrypted ciphertext to determine if they match. In this manner, the plaintext is not compromised and only the party that has access to the receiver's encryption key can create ciphertext that the receiver can decrypt into plaintext.

Figure 4:
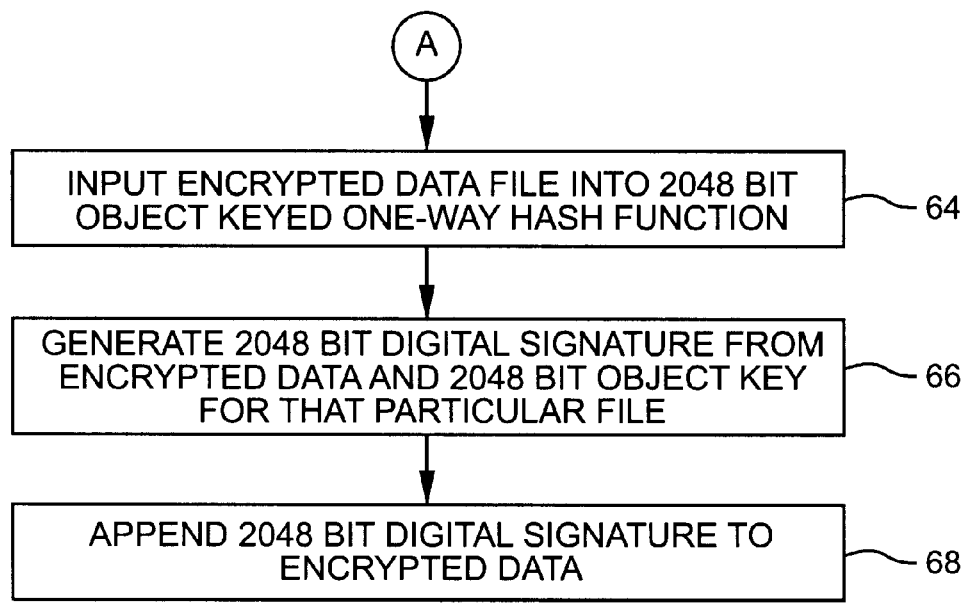
FIG. 4 is a simplified flow chart representation of creating the digital signature to be appended to ciphertext created by the encryption process of FIG. 3.

The unique method for creating the digital signature is illustrated in the flow chart of FIG. 4. The encrypted data file or ciphertext is input into a 2048-bit object keyed one-way hash function 64. A 2048-bit digital signature is produced from the ciphertext along with a 2048-bit object key specific to the particular input file 60. The 2048-bit digital signature is appended to the encrypted data or ciphertext. The 2048-bit digital signature object key is seeded with the output of hash rounds to create the digital signatures for each plaintext file.

As previously noted, the computer implemented encryption device and method of the present invention preferably uses an object key (K_OBJECT) which comprises two 2048-bit sub-object keys (K1; K2). The two sub-object keys are used as inputs to an expansion function that provides 13,584 bytes for the cipher block's key schedule (KS).

Figure 5A:
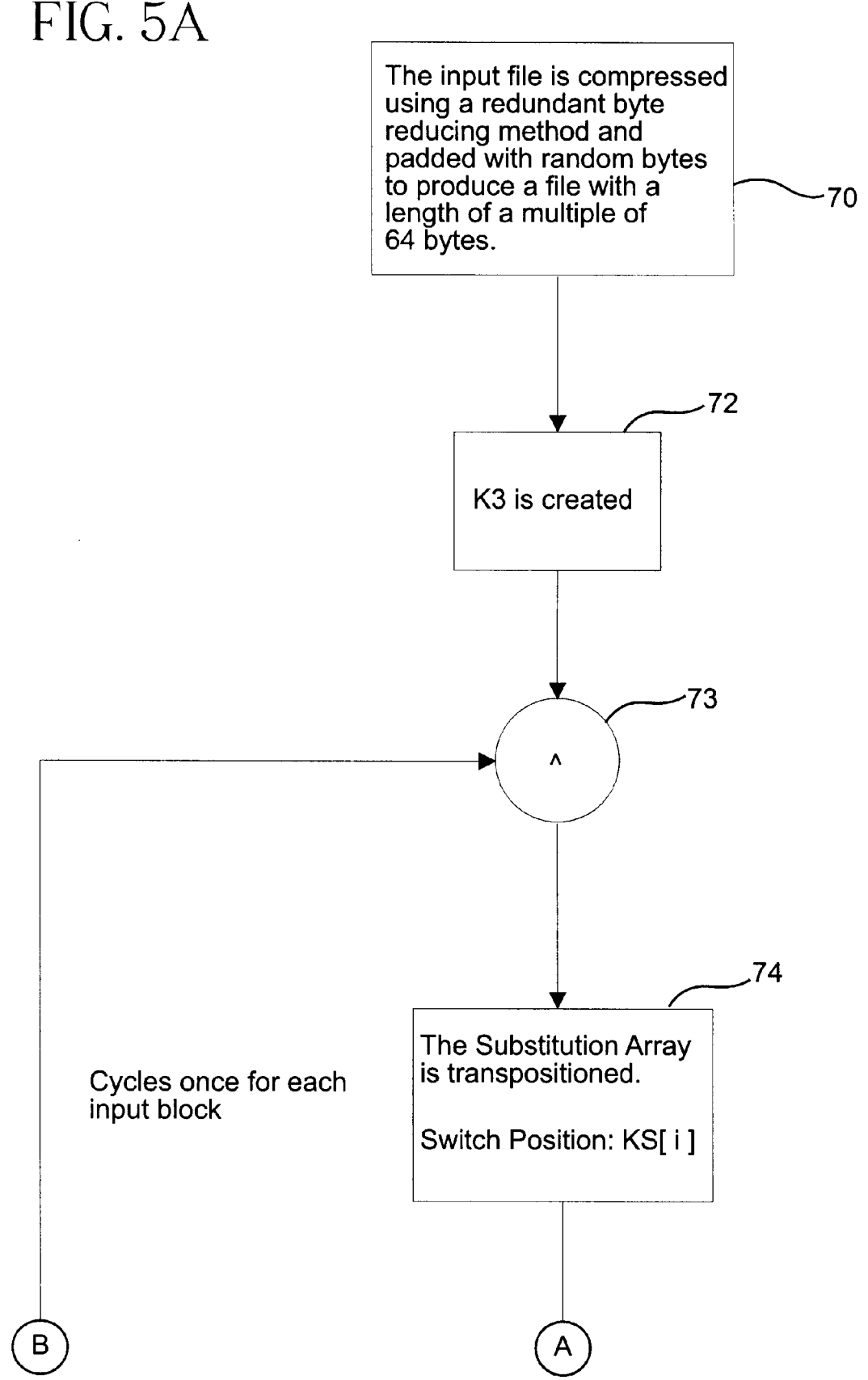
FIG. 5 is a flow chart representation of the steps carried out by the computer system to create ciphertext.
Figure 5B:
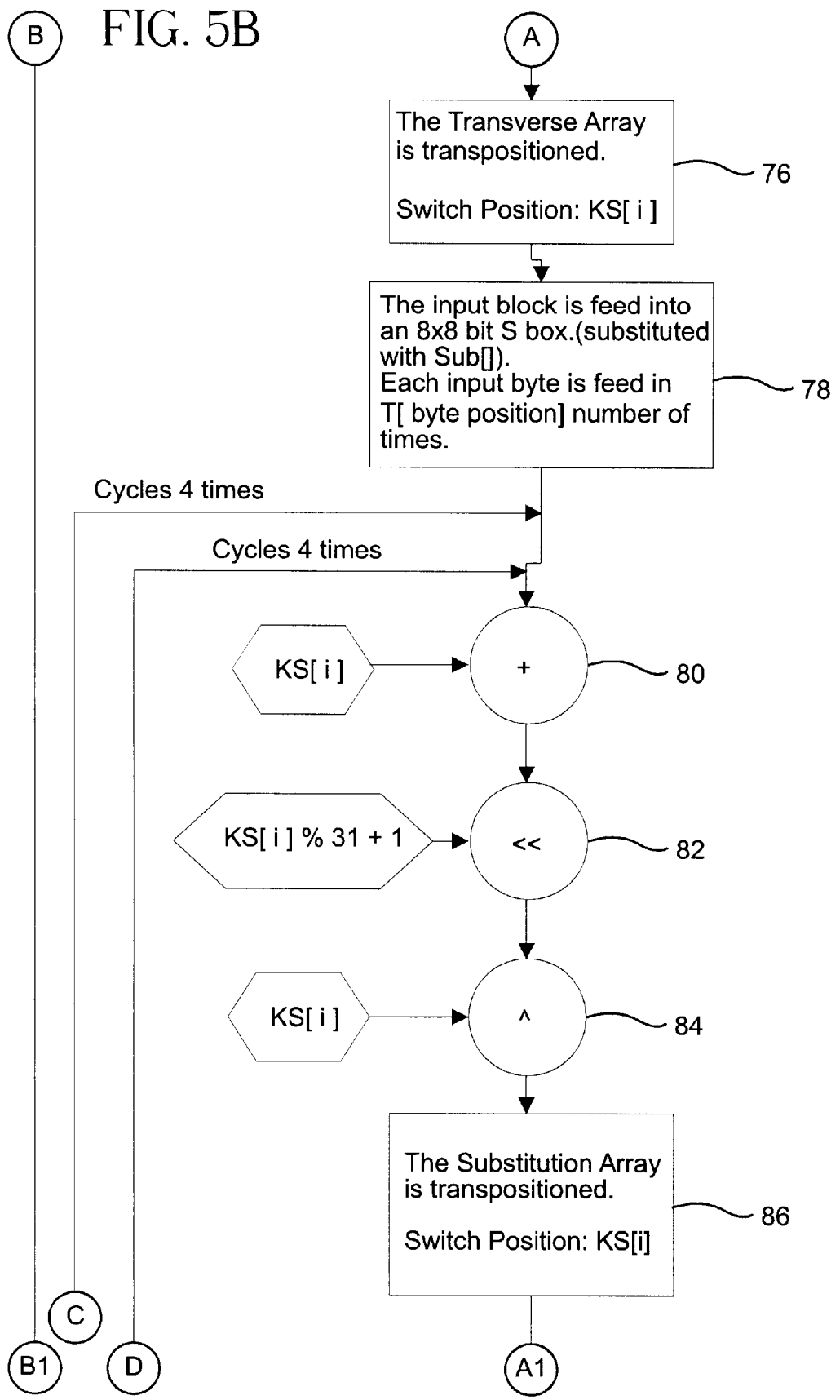
Figure 5D:
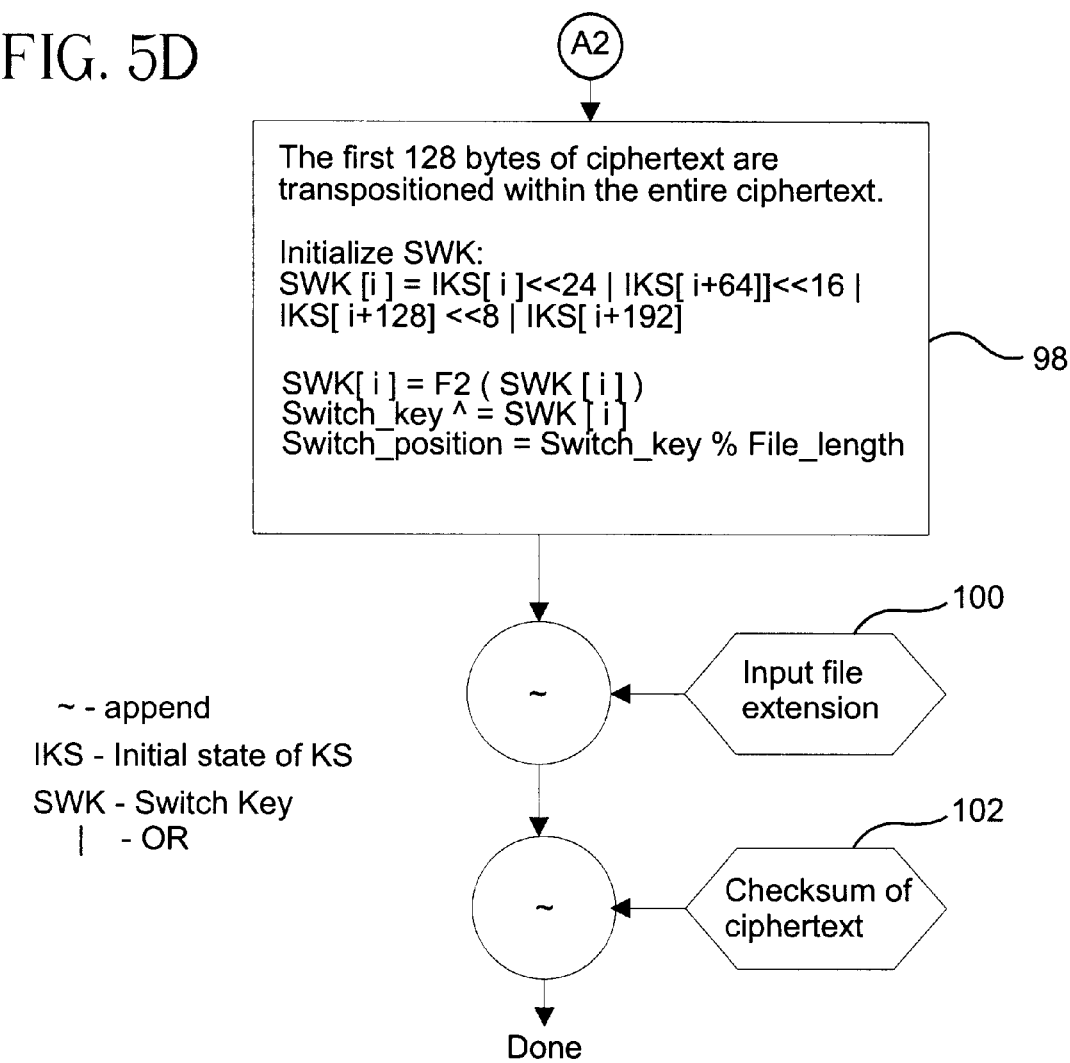

More specifically, FIG. 5 is a flow chart representation of the process to create ciphertext using an object key comprising two sub-object keys and a random session object key. In FIG. 5, the object key is made up of two 2048-bit sub-object keys K1 and K2, respectively. The random session object key is represented by K3 (K3=srand((KS[i]×KS[i]+KS[1])^time (NULL); K3[i]=((rand ( )%255)+1+High_resolution_timer) where "i" is the running index) and KS is the key schedule used to encrypt each plaintext input block of 64 bytes. As earlier described, the object keys K1 and K2 are composed of initial states that are created by the user and functions that modify the keys for each plaintext input block.

Figure 9:
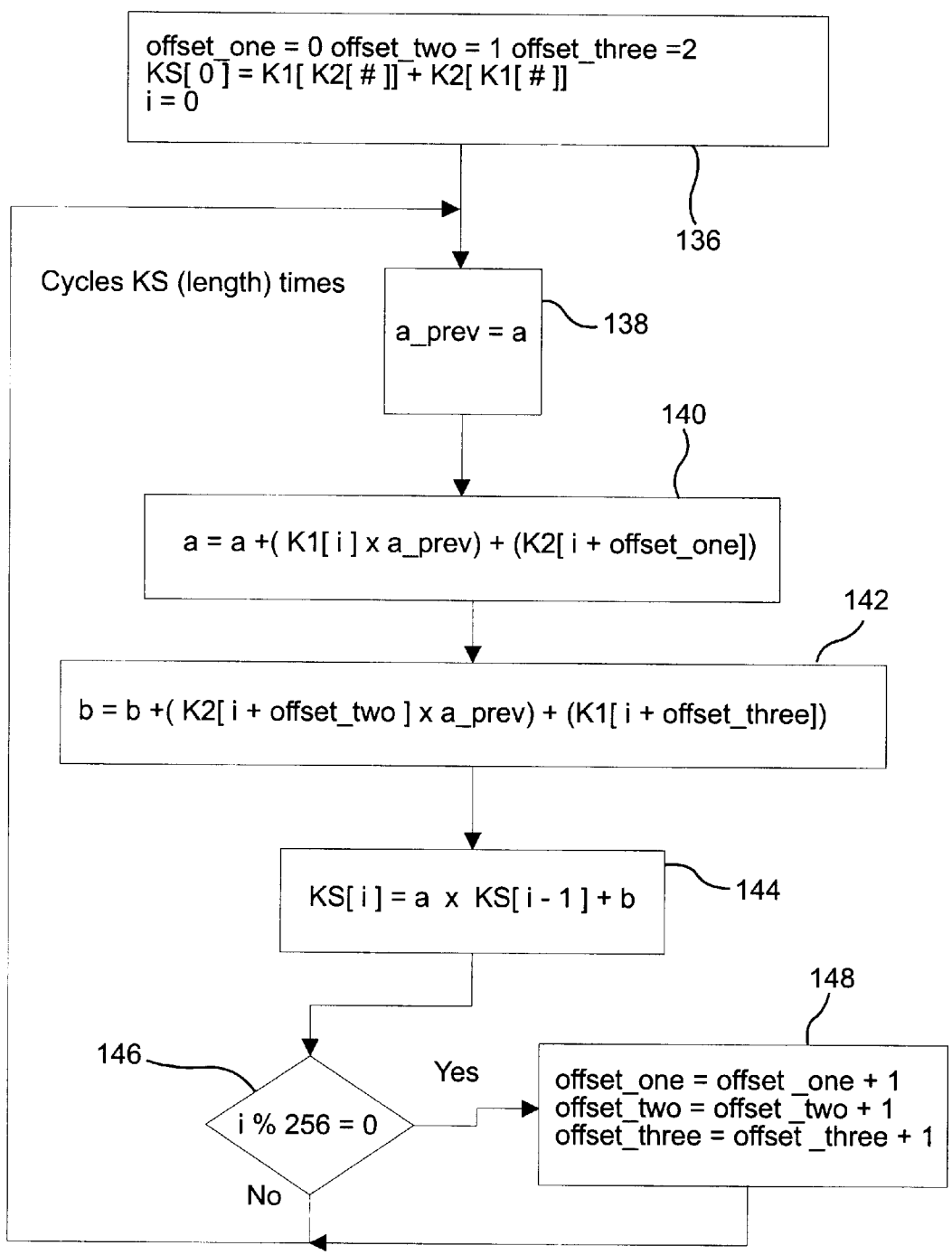
FIG. 9 is a flow chart representation of the methods to create unique key schedules for each block of plaintext to be encrypted in accordance with the present invention.

Referring to FIG. 5, the input file is compressed using a redundant byte reducing method and padded 72 with random bytes to produce a file with a length having a multiple of 512-bits (64 bytes). The encryption process extensively uses linear and non-linear keyed operations on the plaintext to produce the ciphertext. A substitution array 74 consisting of 256 unique 8-bit elements and a transverse array 76 consisting of 64 unique 8-bit elements are continuously transpositioned with respect to the current key schedule. The two arrays 74, 76 provide an 8-bit by 8-bit S-box 78 (substitution process) that contains a transverse count substitution process for each input into the S-box. More specifically, the steps 74, 76 and 78 provide a transposition of a sequence of integers 0–63 with respect to a key and provides a count of substitution rounds for a particular input entering the S-box. Continuing the method, a nested keyed addition 80, sliding window rotation 82, bit-wise exclusive or 84, 8-bit by 8-bit transverse repeated substitution 86, 88, byte transposition 90 and bit transposition encryption process 92 are executed by the computer system. The sliding window rotation operates on a 32-bit boundary incrementing (sliding) one byte (8-bits) after each rotation are used to create the ciphertext. The outer loop cycles four times with the inner loop cycling four times for each outer loop iteration. After each block has been processed, the key modification methods in the object key (K_OBJECT) and the random session object key (R_OBJECT) are performed to modify the object key's and the random session object key's state. A new key schedule is created after the modification methods are performed. The key schedule creation process is illustrated in FIG. 9. In FIG. 9, the two 2048-bit object key states are used to create a 13,584 byte key schedule for the encryption process.

Referring to FIG. 9, the key schedule is created with multiple linear congruential generators. Three offset variables are utilized. Offset_one is initialized to 0, offset_two is initialized to 1 and offset_three is initialized to 2. The first byte of key schedule is set to K1[K2[#]]+K2[K1[#]] (Step 136). In FIG. 9, the letter "a" is a multiplier, "b" is an offset and "a_prev" is the previous value of "a". In step 138, a_prev is initialized. The first linear congruential generator uses K1[index] as a multiplier and K2[index+offset_one] as an offset (Step 140). The index is a running counter. The second linear congruential generator uses K2[index+offset_two] as a multiplier and K1[index+offset_three as an offset (step 142). The third linear congruential generator produces the key schedule. The third linear congruential generator uses the output of the first linear congruential generator as a multiplier and the output of the second linear congruential generator as an offset (step 144). Offset_one, offset_two and offset_three are incremented every 256 rounds (steps 146, 148). In the preferred embodiment, the linear congruential generators are run through 13,584 rounds to produce a 13,584 byte key schedule. (KS as shown in FIG. 5).

Figure 6:
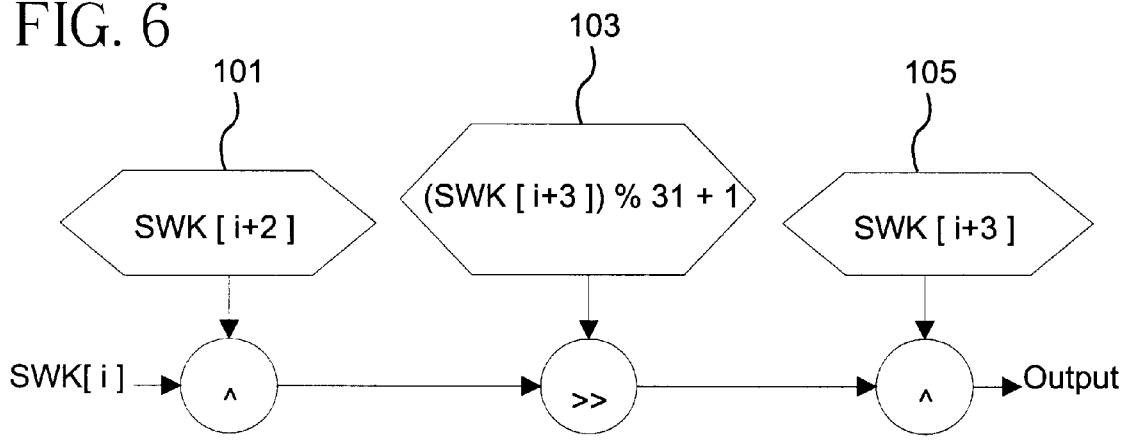
FIG. 6 is a flow chart representation of the switch key function formed in accordance with the present invention.

After all the plaintext blocks have been processed a final 128-byte transposition 98 is performed with the first 128 bytes of ciphertext transpositioned within the entire ciphertext file with respect to a switch-key (SWK). As illustrated in FIG. 6, the switch-key is created from the initial state of the object key. The switch key is initialized with elements of the initial state of the object key. The switch key is grouped by 32-bit blocks and the current switch key element is replaced using the following steps:

the current switch key element is bit-wise exclusive ored to a switch key element indexed two elements from the current element (step 101);

the output of the previous operation is rotated to the right switch key indexed three elements from the current element modulus thirty-one plus one (step 103);

the output of the previous operation is bit-wise exclusive ored to a switch key element indexed three elements from the current element (step 105); and the previous three steps are repeated for each final transposition switch operation. In an alternative embodiment, the steps 101, 103, 105 may include a hashing function in the creation of the switch key.

Referring back to FIG. 5, the plaintext file extension and a checksum are appended to the ciphertext. Delimiters are used to mark the beginning and end of the ciphertext. This completes the encryption process to create the ciphertext, which, in a preferred embodiment, will include a digital signature appended thereto.

Figure 7B:
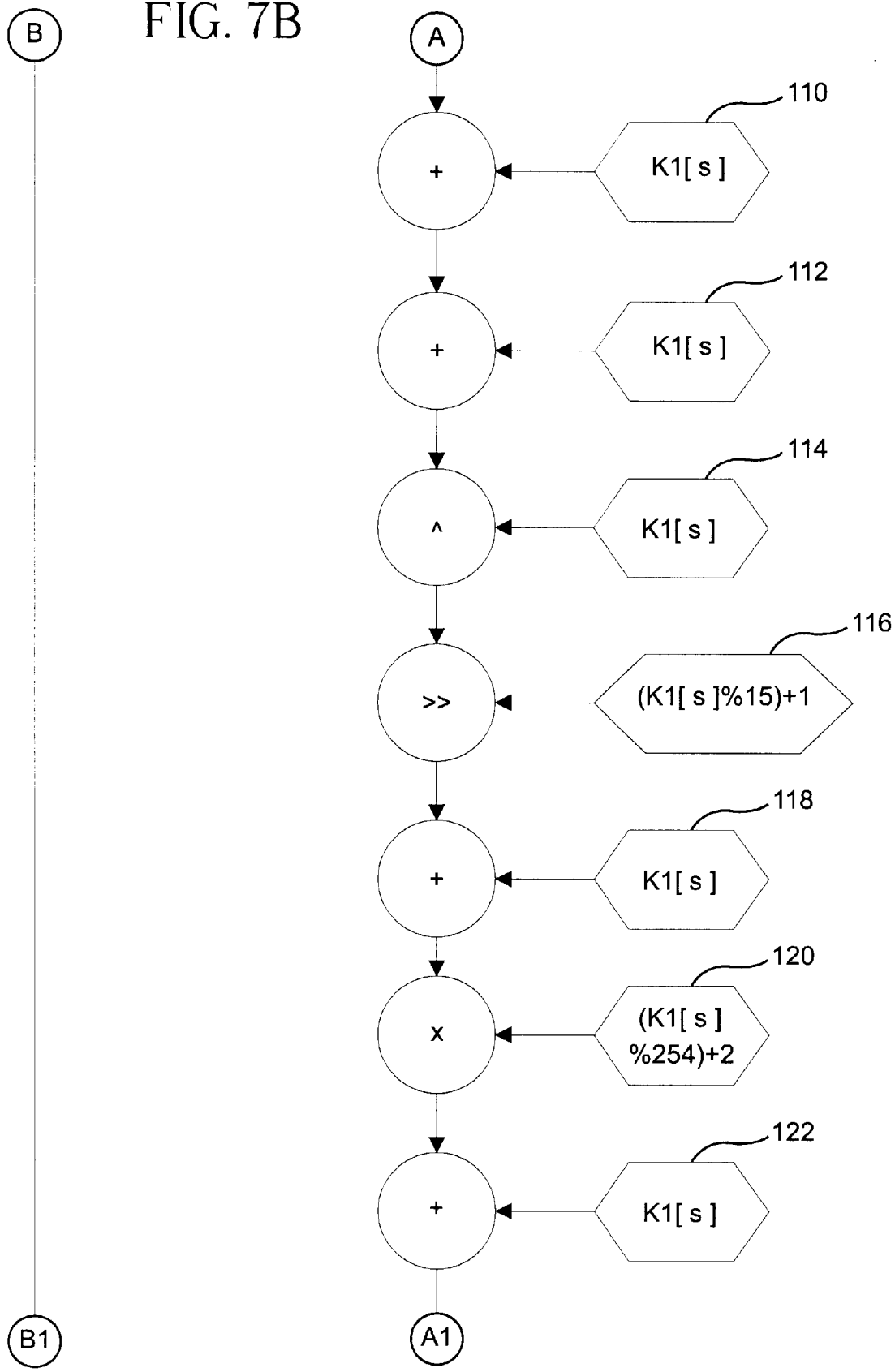
FIG. 7 is a flow chart representation of the modification function of the sub-object key K1 based on seeding from the random session object key K3.
Figure 7C:
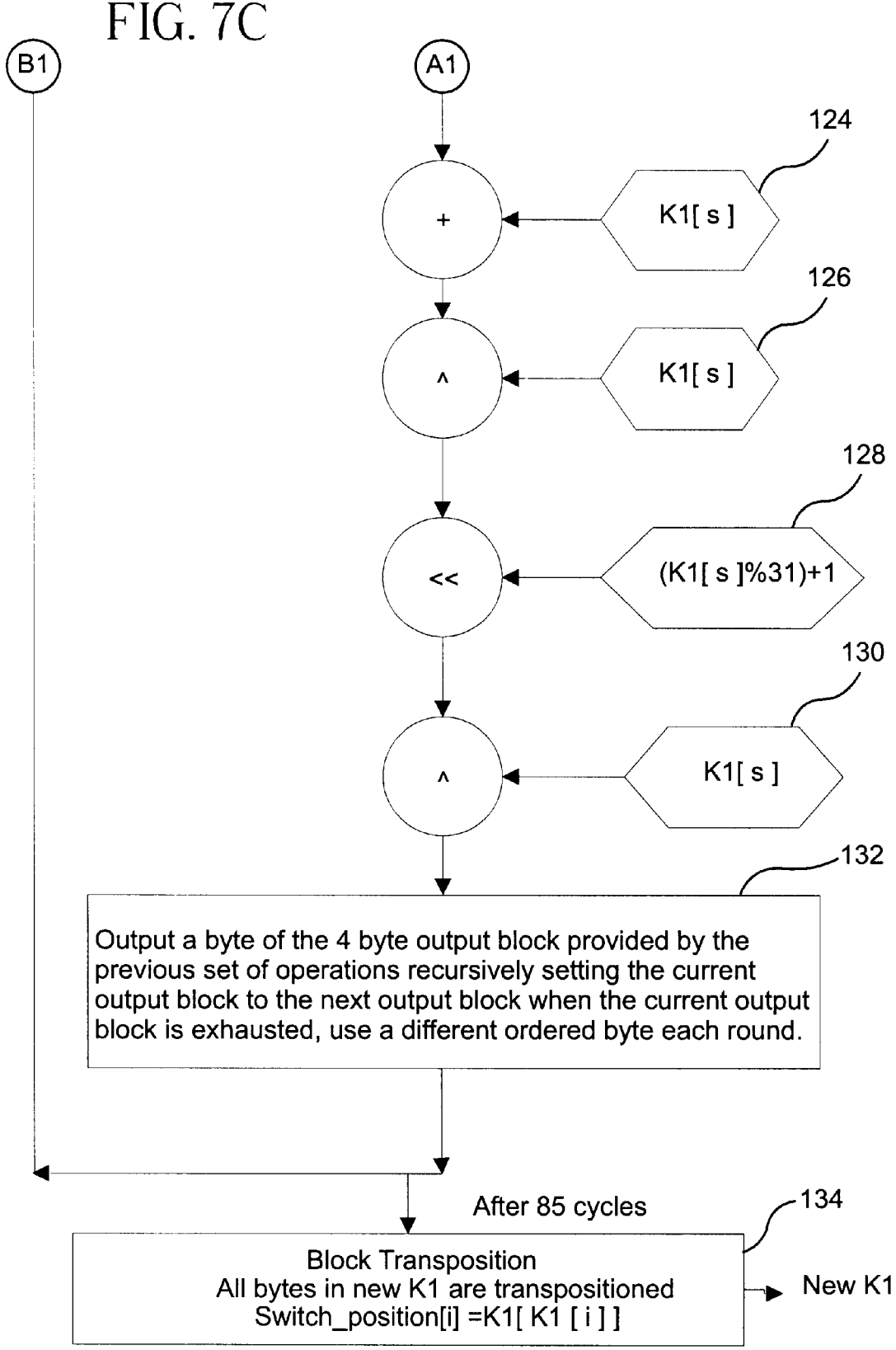

As earlier noted, the object key is dynamic and changes with each block of input data. The first sub-object key's modification method, function F1 of FIG. 5, is illustrated in FIG. 7. In the first execution of the modification method, the random session key's elements are used instead of the running index "s". The first sub-object key (K1) has a modification method which includes the following iterations:

performing a bit-wise exclusive or on an unsigned byte of the random session object key(K3) to an unsigned byte of the current state of the object key provided by an incremented index into the current state of the object key (I_BYTE_OBJECT_KEY) (step 104);

performing an unsigned byte addition on the output byte of the previous operation (PREV_OUTPUT) with I_BYTE_OBJECT_KEY (step 106);

performing a 16-bit multiplication of PREV_OUTPUT and I_BYTE_OBJECT_KEY modulus 254 and add 2 (step 108);

performing a 16-bit addition of PREV_OUTPUT and I_BYTE_OBJECT_KEY (step 110);

performing another 16-bit addition of PREV_OUTPUT and I_BYTE_OBJECT_KEY (step 112);

performing a bit-wise exclusive or of PREV_OUTPUT with a 16-bit unsigned integer of the current state of the object key provided by an incremented index into the current state of the object key (I_INT_OBJECT_KEY) (step 114);

rotating PREV_OUTPUT to the right I_BYTE_OBJECT_KEY modulus 15 plus 1 times (step 116);

performing a 16-bit addition of PREV_OUTPUT and I_INT_OBJECT_KEY (step 118);

performing a 16-bit multiplication of PREV_OUTPUT and I_INT_OBJECT_KEY with the lower order byte of I_INT_OBJECT_KEY modulus 254 plus 2 (step 120);

performing a 16-bit addition of PREV_OUTPUT and I_INT_OBJECT KEY (step 122);

performing another 16-bit addition of PREV_OUTPUT and I_INT_OBJECT_KEY (step 124);

performing a bit-wise exclusive or of PREV_OUTPUT with a 32-bit unsigned long integer of the current state of the object key provided by an incremented index into the current state of the object key (I_LONG_INT_OBJECT_KEY) (step 126);

rotating PREV_OUTPUT to the left I_BYTE_OBJECT_KEY modulus 31 plus 1 times (step 128);

performing a bit-wise exclusive or of PREV_OUTPUT with I_LONG_INT_OBJECT_KEY (step 130);

repeating the previous set of operations eighty-four times substituting the random seed unsigned byte with a byte from the four byte output block provided by the previous set of operations recursively setting the current output block to the next output block when the current output block is exhausted and utilizing a different ordered byte each round (step 132);

performing a byte transposition of the bytes in the new 256 byte output block (N_OUTPUT) provided by the previous set of operations utilizing the following operation:

performing a byte-wise index through N_OUTPUT and switching the current byte of N_OUTPUT with the N_OUTPUT byte indexed at position I_BYTE_OBJECT_KEY, indexing through the entire block of N_OUTPUT (step 134). This modification method makes the ciphertext generated using the dynamic object key immune from cryptanalytic attacks.

Figure 8A:
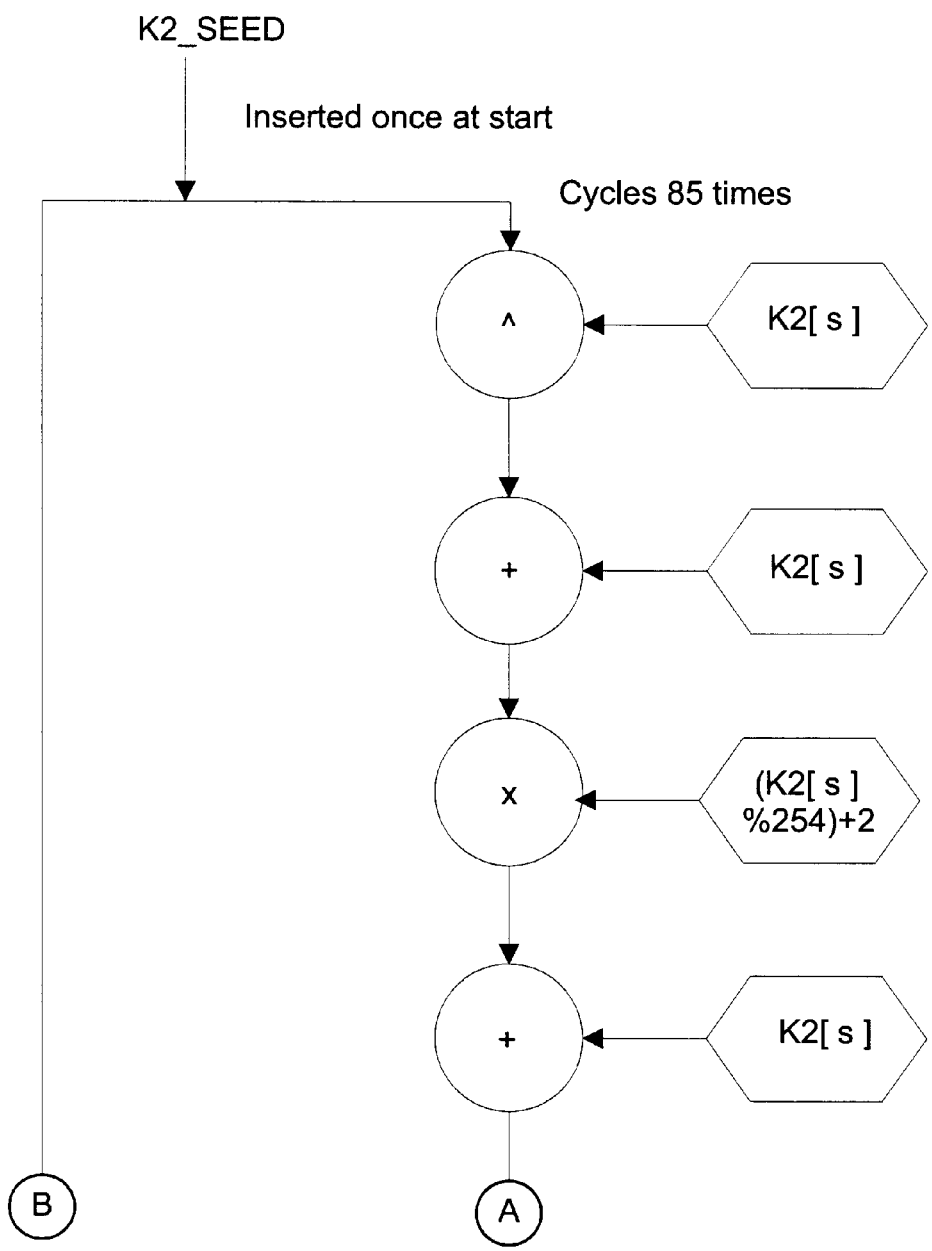
FIG. 8 is a flow chart representation of the modification function of the sub-object key K2 based on seeding from the random session object key K3.
Figure 8B:
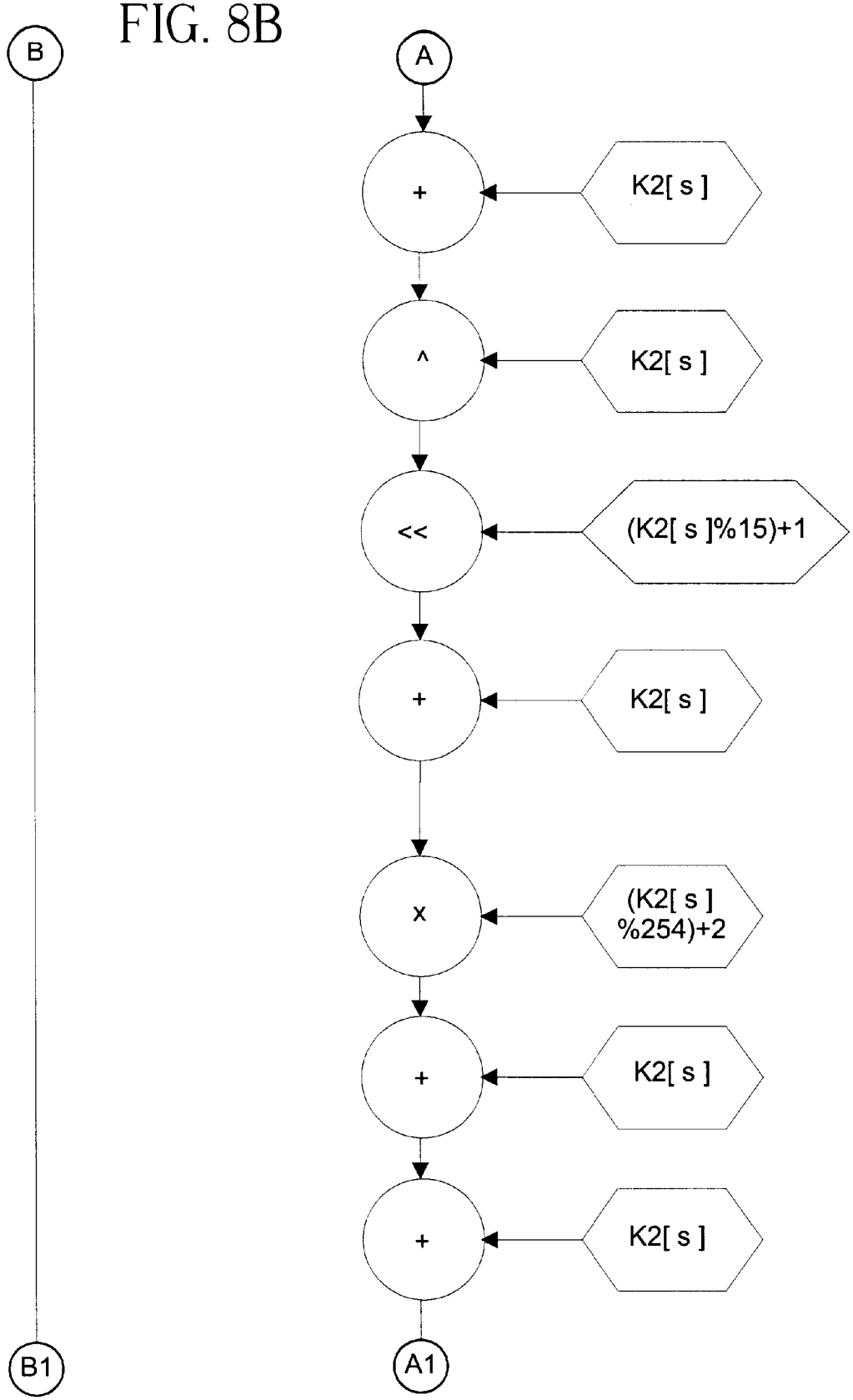
Figure 8C:
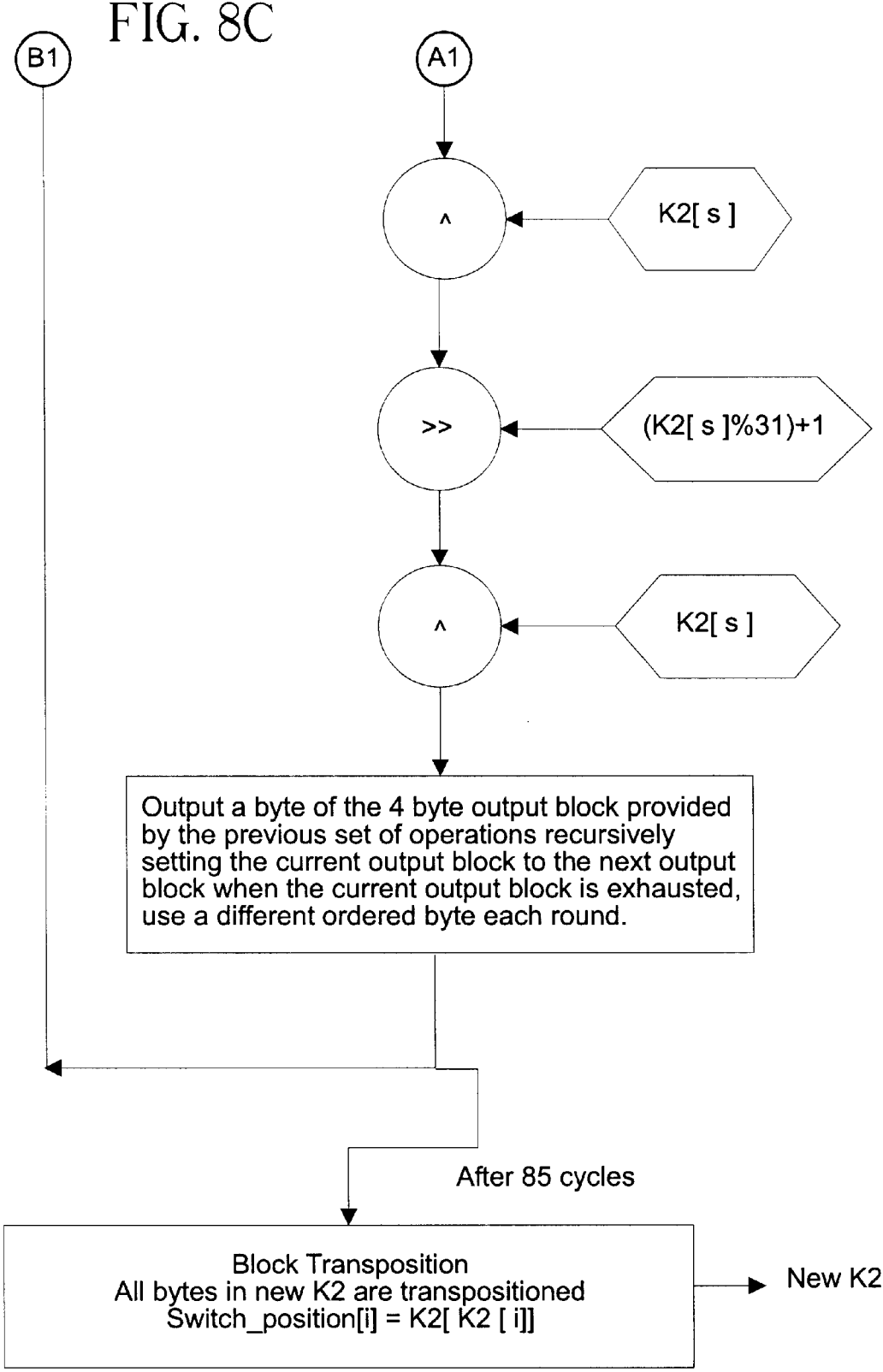

The second sub-object key's (K2) modification method is illustrated in FIG. 8. The second sub-object key's modification method is similar to the first sub-object key's modification method with the exception that the rotations are performed in the reverse.

Accordingly, further discussions of the flow chart illustrated in FIG. 8 is not necessary.

Figure 10:
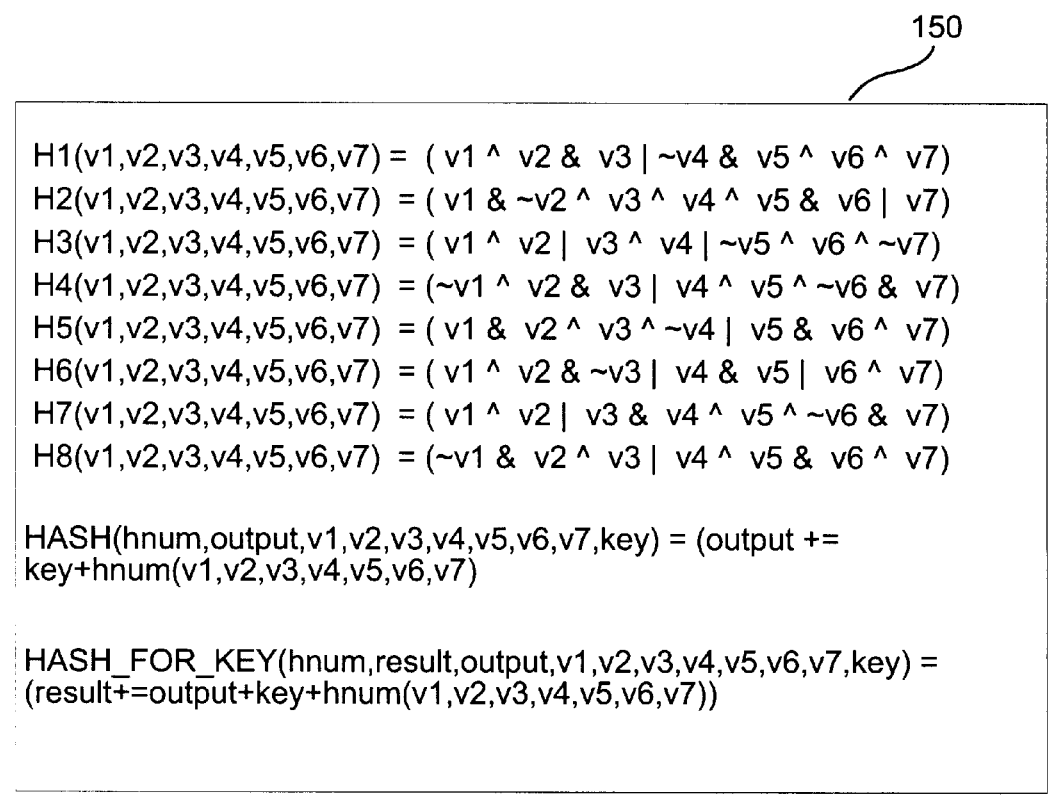

Referring now to FIG. 10, the eight hash functions used to create the 2048-bit object keyed digital signature is illustrated 150. In the preferred embodiment, a digital signature is created and appended to each input plaintext file transformed into ciphertext for authentication purposes. The hash functions illustrated in FIG. 10 are one-way hash functions. Referring to FIG. 12, the process for generating the digital signatures for a file under control of an object key using keyed hashing of the input ciphertext blocks includes the following iterations:

- dividing the input data into 256 byte data blocks (step 200);
- further dividing the data block into 64 32-bit blocks (VAR_BLOCK) (step 202);
- modifying each VAR_BLOCK and element of the key by a plurality of unique one-way irreversible hash function (step 202); (It should be noted that before each VAR_BLOCK modification, the object key used to create the digital signature is modified as illustrated in FIG. 11 (Steps 205).
- repeating the previous steps for all VAR_BLOCK hash function combinations to create an output running message digest (steps 204);
- performing a bit-wise exclusive or of the running message digest to the next input data block (step 206);
- repeating the previous four steps for all data blocks (step 208);
- transpositioning each byte of an output from the previous step by switching a position of each byte with another byte at a position provided by an element of the key wherein the position provided by an element of the key is bounded by the size of the data block (step 210);
- appending a checksum to the digital signature (step 212); and
- appending the digital signature to the ciphertext (step 214).

Delimiters are used to mark the beginning and end of the digital signature. The digital signature generated is appended to the ciphertext to provide for verification by a third party or secured server as earlier described.

Figure 11A:
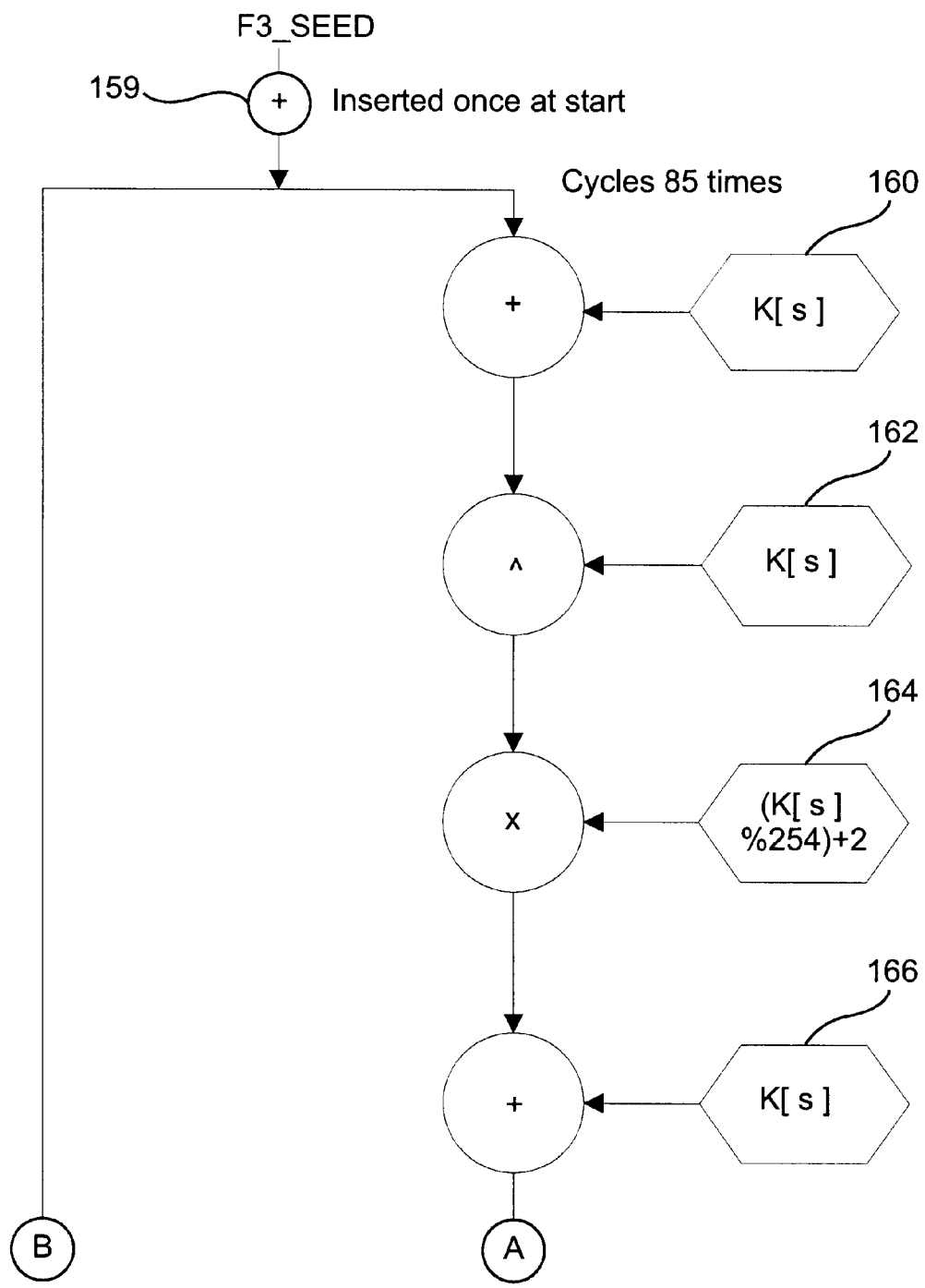
FIG. 11 is a flow chart representation of the modification method of the object key used in generating a digital signature formed in accordance with the present invention.
Figure 11B:
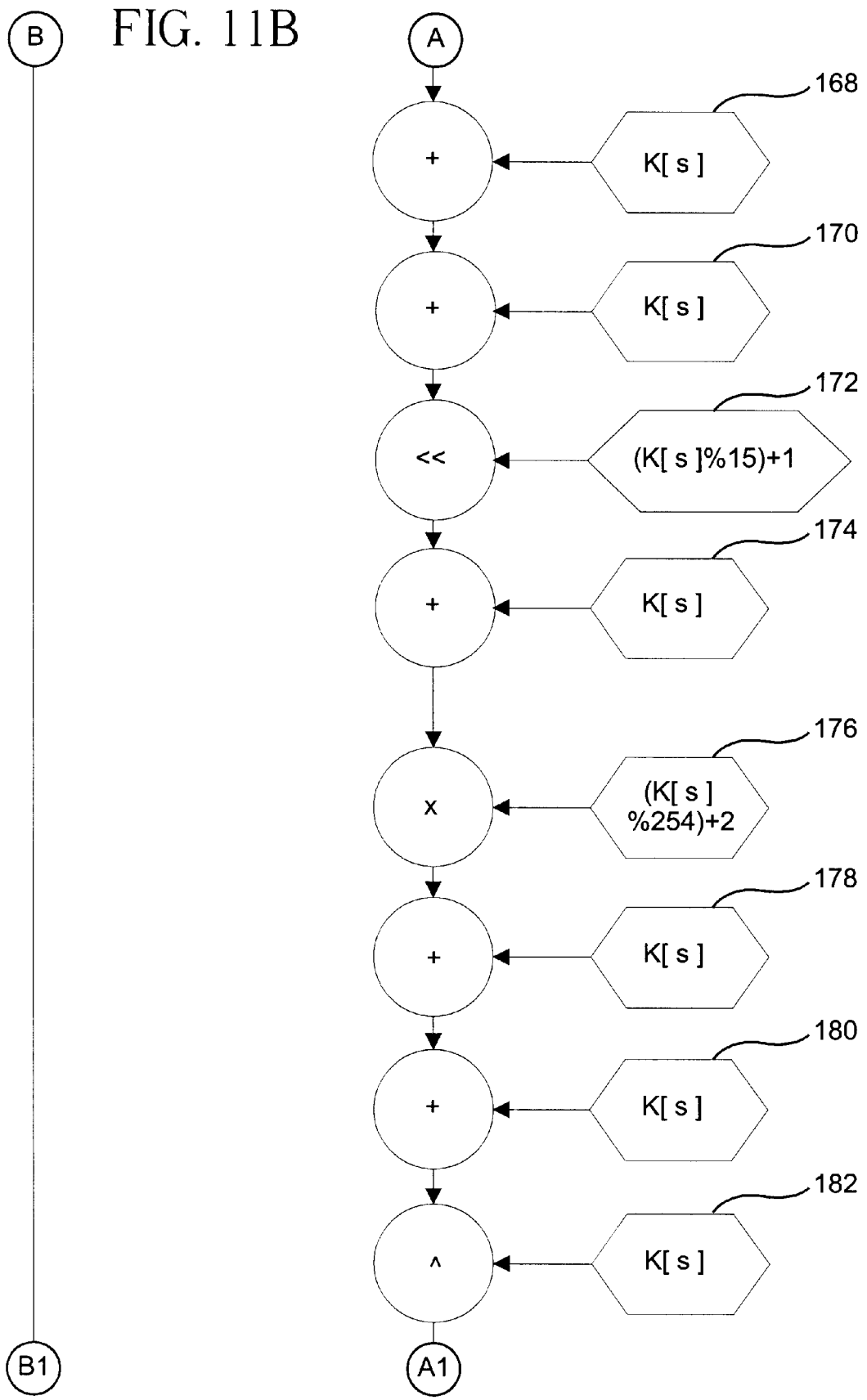
Figure 12B:
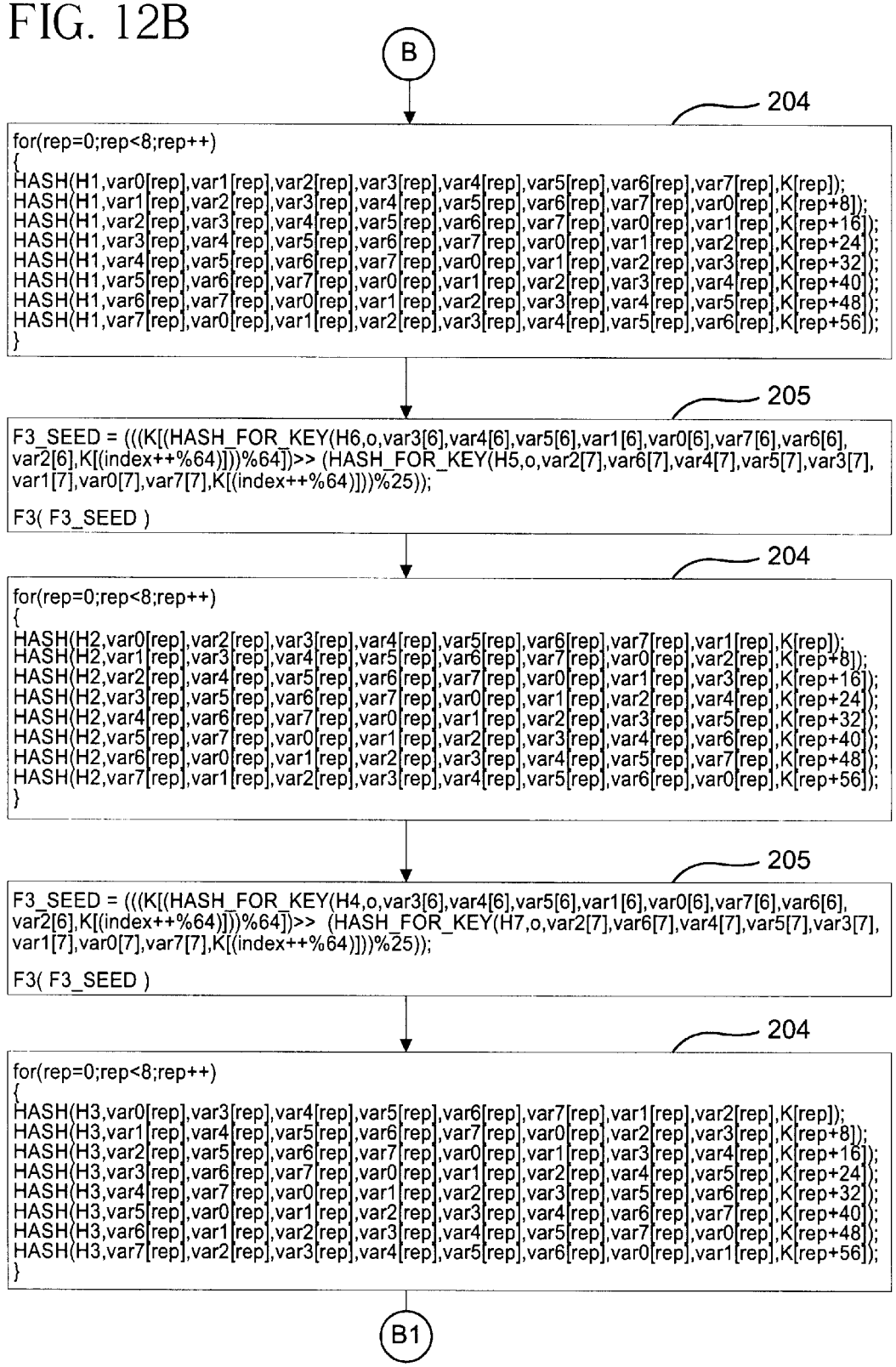
FIG. 12 is a flow chart representation of the method of producing a digital signature in accordance with the present invention.
Figure 12C:
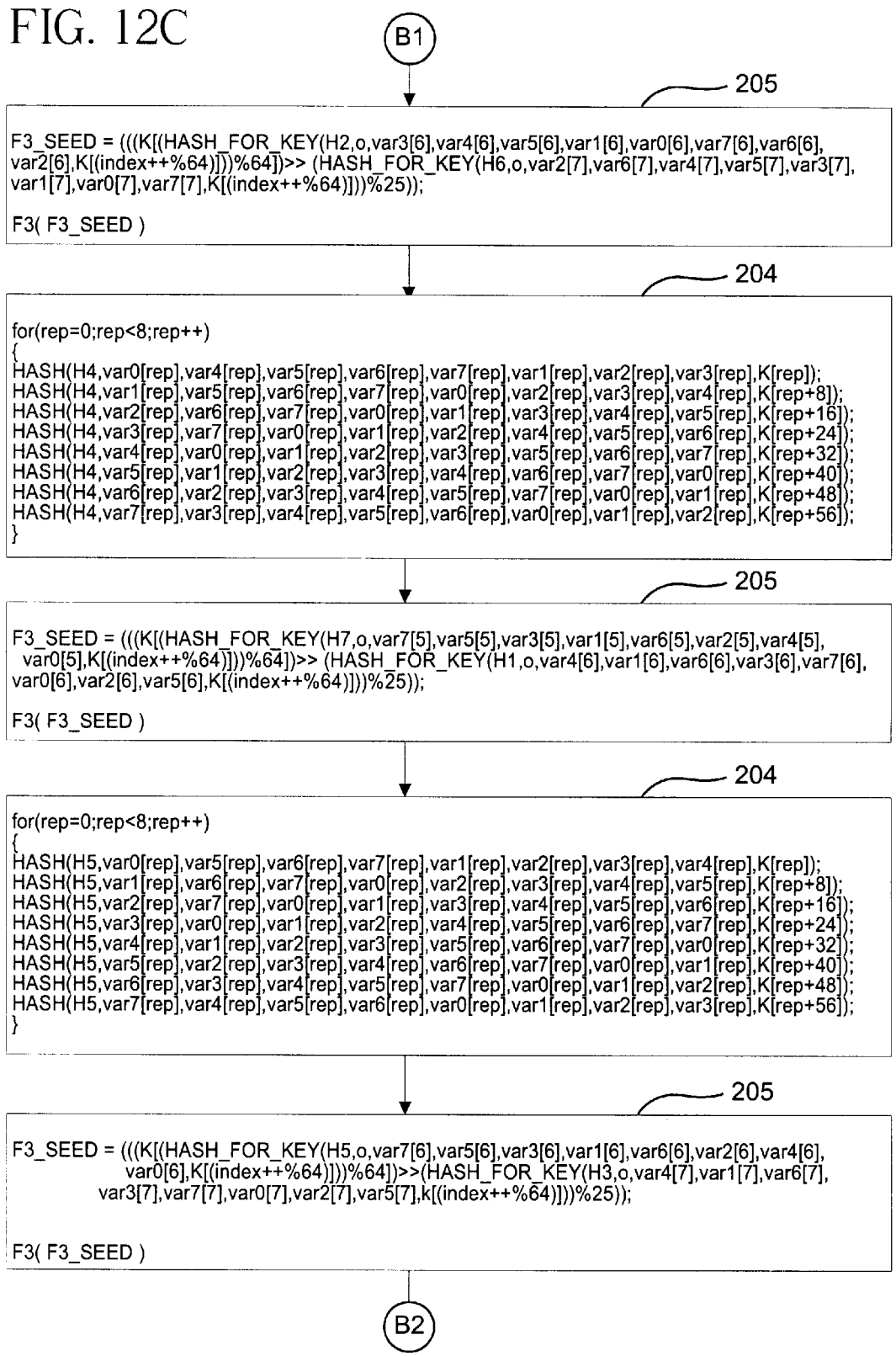
Figure 12E:
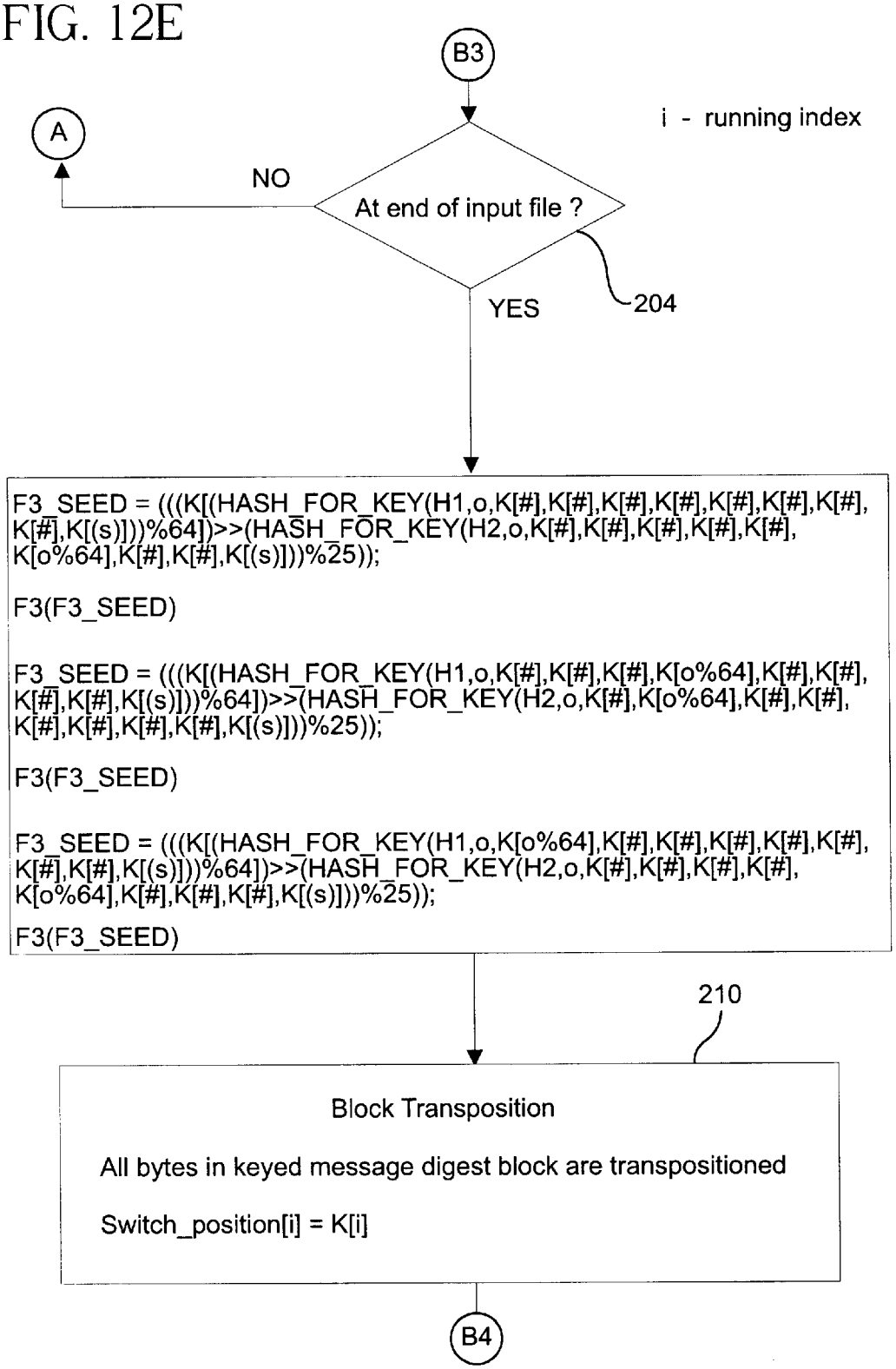
Figure 12F:
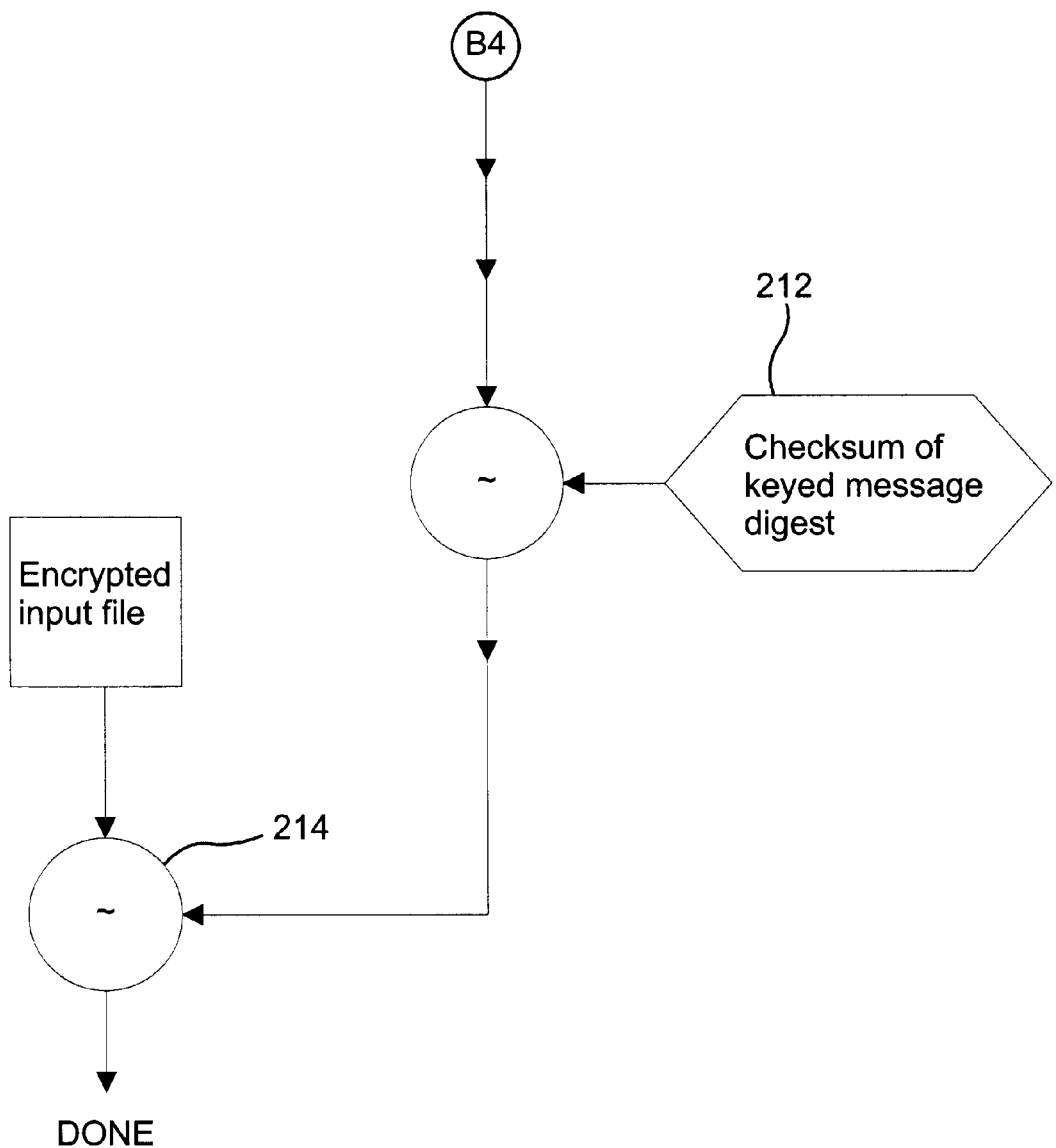

FIG. 11 illustrates the digital signature's object key modification method. The digital signature's object key modification method is composed of the following:

- performing an 8-bit addition or of a seed to an unsigned byte of a current state of the object key provided by an incremented index into the current state of the object key (I_BYTE_OBJECT_KEY) (step 159);
- performing an unsigned byte addition on the output byte of the previous operation (PREV_OUTPUT) with I_BYTE_OBJECT_KEY (step 160);
- performing a bit-wise exclusive or of PREV_OUTPUT to I_BYTE_OBJECT KEY (step 162);
- performing a 16-bit multiplication of PREV_OUTPUT and I_BYTE_OBJECT_KEY modulus 254 and add 2 (step 164);
- performing a 16-bit addition of PREV_OUTPUT and I_BYTE_OBJECT KEY (step 166);
- performing another 16-bit addition of PREV_OUTPUT and I_BYTE_OBJECT_KEY (step 168);
- performing another 16-bit addition of PREV_OUTPUT and I_BYTE_OBJECT_KEY (step 170);
- rotating PREV_OUTPUT to the left I_BYTE_OBJECT_KEY modulus 15 plus 1 times (step 172);
- performing a 16-bit addition of PREV_OUTPUT and I_INT_OBJECT_KEY (step 174);
- performing a 16-bit multiplication of PREV_OUTPUT and I_INT_OBJECT_KEY with the lower order byte of I_INT_OBJECT_KEY modulus 254 plus 2 (step 176);
- performing a 16-bit addition of PREV_OUTPUT and I_INT_OBJECT KEY (step 178);
- performing another 16-bit addition of PREV_OUTPUT and I_INT_OBJECT_KEY (step 180);
- performing a bit-wise exclusive or of PREV_OUTPUT with a 32-bit unsigned long integer of the current state of the object key provided by an incremented index into the current state of the object key (I_LONG_INT_OBJECT_KEY) (step 182);
- rotating PREV_OUTPUT to the right I_BYTE_OBJECT_KEY modulus 31 plus 1 times (step 184);
- performing a 32-bit addition of PREV_OUTPUT and I_INT_OBJECT KEY (step 186);
- repeating the previous set of operations eighty-four times substituting the seed unsigned byte with a byte from the four byte output block provided by the previous set of operations recursively setting the current output block to the next output block when the current output block is exhausted and utilizing a different ordered byte each round (step 188);
- performing a byte transposition of the bytes in the new 256 byte output block (N_OUTPUT) provided by the previous set of operations utilizing the following operation:
- performing a byte-wise index through N_OUTPUT and switching the current byte of N_OUTPUT with the N_OUTPUT byte indexed at position I_BYTE_OBJECT_KEY and finally indexing through the entire block of N_OUTPUT (step 190). This modification method is used to modify the object key for each block of input data. Accordingly, the object key for creating the digital signature is also is dynamic as earlier described.

In the preferred embodiment, the encrypted ciphertext is signed by the originator to authenticate the information. More specifically, a digital signature is generated which is appended to the ciphertext. In the present invention, the digital signature is created under the control of the key, preferably an object key comprising data and methods that modify the data, and is unique to each ciphertext file by using the ciphertext as input into the digital signature generation process.

Accordingly, the present invention overcomes the disadvantages of known encryption processes by creating ciphertext immune to currently available cryptanalytic attacks. The cryptographic communications system of the present invention provides for an encryption process utilizing a dynamic object key. The initial state of the object key is created by the user and a method that modifies the keys based on seeding from the random session object key which is also a dynamic key whose initial state is set by a random number. Based on the object key, a different key schedule is used to encrypt each block of data in the preferred block cipher data encryption process. It will be appreciated by those skilled in the art that the use of a dynamic object key and encrypting with different key schedules can make most currently available encrypting processes stronger, i.e., more immune to cryptanalytic attacks Tho authenticate the ciphertext, a 2048-bit secret key digital signature is appended to the ciphertext. The digital signature is generated using the ciphertext as input and is unique for each ciphertext file. More specifically, the ciphertext is sent into a one-way keyed hash function to produce the digital signature.

Although the illustrative embodiments of the present invention have been described herein with reference to the accompanying drawings, it is to be understood that the invention is not limited to those precise embodiments, and that various other changes and modifications may be effected therein by one skilled in that art without departing from the scope of the invention.

What is claimed is:

1. A computer implemented method for encrypting data comprising the steps of:
    creating at least one object key in a block cipher, the at least one object key comprising data and methods that operate on said data;
    creating a key schedule based upon the at least one object key;
    encrypting a random session object key in a block cipher encryption process with the at least one object key;
    encrypting a block of input plaintext data utilizing said key schedule;
    modifying the at least one object key based on seeding from the random session object key;
    modifying the key schedule based upon the at least one modified object key;
    encrypting a next block of input plaintext data utilizing said modified key schedule; and
    repeating the steps of modifying the at least one object key, modifying the key schedule and encrypting utilizing the modified key schedule until the encrypting of blocks of plaintext data is completed.

2. A computer implemented method as defined in claim 1, wherein the modification of the key schedule is independent of the input plaintext data.

3. A computer implemented method as defined in claim 1, further comprising prior to the first step of encrypting the steps of:
    creating an initial state of the at least one object key by the user;
    creating an initial state of a random session object key; and
    encrypting the initial state of the random session object key in a block cipher encryption process with the initial state of the at least one object key.

4. A computer implemented method as defined in claim 3, wherein the initial state of the random session object key is created by generating a random number.

5. A computer implemented method as defined in claim 4, wherein a new random number is generated and assigned as the initial state of the random session object key for each block of input plaintext to be encrypted.

6. A computer implemented method as defined in claim 3, wherein the method comprises two object keys utilized to produce the key schedule for each block of input plaintext.

7. A computer implemented method as defined in claim 1, wherein the method of modifying the at least one object key comprises the steps of:
    generating a random seed unsigned byte and bit wise exclusive or to an unsigned byte of a current state of the at least one object key provided by an incremented index into the current state of the object key (I_BYTE_OBJECT_KEY);
    performing an unsigned byte addition on the output byte of the previous operation (PREV_OUTPUT) with I_BYTE_OBJECT_KEY;
    performing a 16-bit multiplication of PREV_OUTPUT and I_BYTE_OBJECT_KEY modulus 254 and add 2;
    performing a 16-bit addition of PREV_OUTPUT and I_BYTE_OBJECT_KEY;
    performing another 16-bit addition of PREV_OUTPUT and I_BYTE_OBJECT_KEY;
    performing a bit-wise exclusive or of PREV_OUTPUT with a 16-bit unsigned integer of the current state of the object key provided by an incremented index into the current state of the object key (I_INT_OBJECT_KEY);
    rotating PREV_OUTPUT to the right I_BYTE_OBJECT_KEY modulus 15 plus 1 times;
    performing a 16-bit addition of PREV_OUTPUT and I_INT_OBJECT_KEY;
    performing a 16-bit multiplication of PREV_OUTPUT and I_INT_OBJECT_KEY with the lower order byte of I_INT_OBJECT KEY modulus 254 plus 2;
    performing a 16-bit addition of PREV_OUTPUT and I_INT_OBJECT_KEY;
    performing another 16-bit addition of PREV_OUTPUT and I_INT_OBJECT KEY;
    performing a bit-wise exclusive or of PREV_OUTPUT with a 32-bit unsigned long integer of the current state of the object key provided by an incremented index into the current state of the object key (I_LONG_INT_OBJECT_KEY);
    rotating PREV_OUTPUT to the left I_BYET_OBJECT_KEY modulus 31 plus 1 times;
    performing a bit-wise exclusive or of PREV_OUTPUT with I_LONG_INT_OBJECT_KEY;
    repeating the previous set of operations eighty-four times substituting the random seed unsigned byte with a byte from a four byte output block provided by the previous set of operations recursively setting the current output block to a next output block when the current output block is exhausted, utilizing a different ordered byte each round;
    performing a byte transposition of the bytes in the new 256 byte output block (N_OUTPUT) provided by the previous set of operations utilizing the following steps:
    performing a byte-wise index through N_OUTPUT; switching the current byte of N_OUTPUT with the N-OUTPUT byte indexed at position I_BYTE_OBJECT_KEY; and indexing through the entire block of N_OUTPUT.

8. A computer implemented method as defined in claim 1, wherein said object key is dynamic and a modification method of said object key includes a hashing function.

9. A computer implemented method as defined in claim 1, wherein the object key is dynamic and includes at least two sub-object keys, and further wherein each sub-object key has a unique modification method associated therewith.

10. A computer implemented method as defined in claim 3, wherein the object key includes at least two sub-object keys and the random session object key operations with the object key are performed with only one of said sub-object keys.

11. A computer implemented method as defined in claim 3, wherein creating the initial state of the random session key object comprises the steps of:
  accessing a running time clock in a computer;
  multiplying together unique byte elements of the object key and summing and performing a bit-wise exclusive or to the time clock;
  using the output of the previous step as a seed for a rand( ) function available in C libraries;
  using an output of the rand( ) function modulus 255 plus an offset of 1 plus the lower eight bits of a high resolution computer clock timer is calculated and stored as one byte of the initial state of the random session object key;
  repeating the previous set steps for each byte in the initial state of the random session key object.

12. A computer implemented method as defined in claim 3, wherein the modification method for the random session object key comprises the steps of:
  indexing through each byte of the current state of the random session key object (I_BYTE_R_OBJECT) and replacing that byte with the output of the following operation:
  double indexing into the object key with I_BYTE_R_OBJECT as a starting index and add an offset and I_BYTE_OBJECT_KEY.

13. A computer implemented method as defined in claim 3, wherein the modification method of said random session object key includes a hashing function.

14. A computer implemented method as defined in claim 3, wherein said object key is first initialized with the random session key object by using an initial current state of the random session key object to provide a key schedule in the modification method of the object key.

15. A computer implemented method as defined in claim 2, wherein input plaintext is compressed using a redundant byte reducing method and padded with random bytes to produce a file with a length that is evenly divisible by the block length so that the plaintext blocks are processed by said block cipher system.

16. A computer implemented method as defined in claim 3, further including the step of performing a keyed transposition of ciphertext bytes after all input blocks are encrypted.

17. A computer implemented method as defined in claim 2, wherein the encrypting step comprises the steps of:
  transposition a substitution array whose elements contain unique numbers in reference to substitution array by switching a position of each element with a position provided by an element of a key.

18. A computer implemented method as defined in claim 17, wherein the position provided by an element of the key is bounded by the size of said substitution array.

19. A computer implemented method as defined by claim 1, wherein the block cipher encryption process comprises the steps of:
  transpositioning a substitution array whose elements contain unique numbers in reference to said substitution array by switching a position of each element with a position provided by an element of a key, which position provided by an element of the key is bounded by the size of said substitution array which is composed of 256 elements;
  transpositioning a transverse array whose elements contain unique numbers in reference to said transverse array by switching a position of each element with a position provided by an element of the key, the position provided by an element of the key is bounded by the size of the transverse array which is equal to the block size;
  replacing each input byte transverse number of times with the value of the substitution array indexed with the input byte;
  summing each output byte of the previous three steps to an element of the key to create ciphertext;
  grouping the ciphertext in a 32-bit sliding window and rotating to the left an element of the key modulus 31 plus 1 times, the window sliding by one byte after each rotation and this step being performed on all ciphertext bytes:
  performing a bit-wise exclusive or of each cipher text byte to an element of the key;
  transpositioning the substitution array by switching a position of each element with a position provided by an element of the key, the position provided by an element of the key is bounded by a size of said substitution array;
  tanspositioning the transverse array by switching a position of each element with a position provided by an element of the key, the position provided by an element of the key is bonded by a size of said transverse array;
  replacing each input byte transverse number of time with a value of the substitution array indexed with an input byte;
  transpositioning the ciphertext by switching a position of each ciphertext element with a position provided by an element of the key, the position provided by an element of the key is bounded by a size of the block;
  repeating the previous seven steps four times with the key elements being unique each time the key is accessed;
  transpositioning each bit in the ciphertext block by switching a position of each ciphertext bit with a position provided by elements of the key, the position provided by elements of the key are bounded by the size of the blocks times eight; and
  repeating the previous nine steps four times with the key elements being unique each time the key is accessed.

20. A computer implemented method as defined in claim 19, wherein said key is the at least one object key.

21. A computer implemented method as defined in claim 19, wherein the last transpositioning step uses a switch key comprised of the following steps:
  initializing the switch key with elements of an initial state of the object key;
  grouping the switch key by 32-bit blocks;
  replacing the current switch key element with the following process:
  performing a bit-wise exclusive or of the current switch key element to a switch key element indixed two elements from the current element;
  rotating the output of the previous step to the right switch key indexed three elements from the current element modulus thirty-one plus one;
  performing a bit-wise exclusive or of the output from the previous step to a switch key element indexed three elements from the current element;
  repeating the previous three steps for each final transposition switch operation.

22. A computer implemented method as defined in claim 21, wherein a hashing function is included in the creation of the switch key.

23. A cryptographic communications system comprising:
at least two networked computer systems linked by a communication channel; and
each computer system including a central processing unit and a memory storage device for executing a block cipher encryption/decryption process;
wherein the encryption process transforms an input plaintext message to a ciphertext message and the decryption process transforms the ciphertext message to the input plaintext message, the encryption/decryption process using at least one dynamic object key which is modified using a non-linear function for each block of input data, each object key being associated with a different key schedule to encrypt/decrypt the input plaintext/output ciphertext message.

24. A cryptographic communications system as defined in claim 23, wherein the encryption/decryption process further includes the use of a random session object key having an initial state randomly generated by the computer system, and wherein the object key modifications are based on seeding from the random session object key.

25. A cryptographic communications system as defined in claim 24, wherein an initial state of the object key is created by the user and wherein the initial state of the random session object key is created by the computer system generating a random number.

26. A cryptographic communications system as defined in claim 23, wherein the block cipher encryption/decryption process includes use of a keyed transposition of a sequence of integers provides a count of substitution rounds for a particular input entering an S-box.

27. A computer implemented method for encrypting data comprising the steps of:
creating at least one object key comprising data and methods that operate on said data; and
modifying the at least one object key for each input block of plaintext utilizing the at least one object key in conjunction with an encryption process; wherein the step of modifying the at least one object key comprises the steps of:
generating a random seed unsigned byte and bit wise exclusive or to an unsigned byte of a current state of the object key provided by an incremented index into the current state of the object key (I_BYTE_OBJECT_KEY);
performing an unsigned byte addition on the output byte of the previous operation (PREV_OUTPUT) with I_BYTE_OBJECT_KEY;
performing a 16-bit multiplication of PREV_OUTPUT and I_BYTE_OBJECT_KEY modulus 254 and add 2;
performing a 16-bit addition of PREV_OUTPUT and I_BYTE_OBJECT_KEY;
performing another 16-bit addition of PREV_OUTPUT and I_BYTE_OBJECT_KEY;
performing a bit-wise exclusive or of PREV_OUTPUT with a 16-bit unsigned integer of the current state of the object key provided by an incremented index into the current state of the object key (I_INT_OBJECT_KEY);
rotating PREV_OUTPUT to the right I_BYTE_OBJECT_KEY modulus 15 plus 1 times;
performing a 16-bit addition of PREV_OUTPUT and I_$_{INT}$_OBJECT_KEY;
performing a 16-bit multiplication of PREV_OUTPUT and I_INT_OBJECT_KEY with the lower order byte of I_INT_OBJECT_KEY modulus 254 plus 2;
performing a 16-bit addition of PREV_OUTPUT and I_INT_OBJECT_KEY;
performing another 16-bit addition of PREV_OUTPUT and I_INT_OBJECT_KEY;
performing a bit-wise exclusive or of PREV_OUTPUT with a 32-bit unsigned long integer of the current state of the object key provided by an incremented index into the current state of the object key (I_LONG_INT_OBJECT_KEY);
rotatino PREV_OUTPUT to the left I_BYET_OBJECT KEY modulus 31 plus 1 times;
performing a bit-wise exclusive or of PREV_OUTPUT with I_LONG_INT_OBJECT_KEY;
repeating the previous set of operations eighty-four times substituting the random seed unsigned byte with a byte from a four byte output block provided by the previous set of operations recursively setting the current output block to a next output block when the current output block is exhausted, utilizing a different ordered byte each round;
performing a byte transposition of the bytes in the new 256 byte output block (N_OUTPUT) provided by the previous set of operations utilizing the following steps:
performing a byte-wise index through N_OUTPUT;
switching the current byte of N_OUTPUT with the N-OUTPUT byte indexed at position I_BYTE_OBJECT_KEY, and indexing through the entire block of N_OUTPUT.

28. A computer implemented method for encrypting data comprising the steps of:
creating at least one object key comprising data and methods that operate on said data; and
encrypting input plaintext data utilizing said object key in conjunction with a block cipher encryption process, wherein the block cipher encryption process comprises the steps of:
transpositioning a substitution array whose elements contain unique numbers in reference to said substitution array by switching a position of each element with a position provided by an element of a key, which position provided by an element of the key is bounded by the size of said substitution array which is composed of 256 elements;
transpositioning a traverse array whose elements contain unique numbers in reference to said transverse array by switching a position of each element with a position provided by an element of the key, the position provided by an element of the key is bounded by the size of the transverse array which is equal to the block size;
replacing each input byte transverse number of times with the value of the substitution array indexed with the input byte;
summing each output byte of the previous three steps to an element of the key to create ciphertext;
grouping the ciphertext in a 32-bit sliding window and rotating to the left an element of the key modulus 31 plus 1 times, the window sliding by one byte after each rotation and this step being performed on all ciphertext bytes:
performing a bit-wise exclusive or of each cipher text byte to an element of the key;
transpositioning the substitution array by switching a position of each element with a position provided by an element of the key, the position provided by an element of the key is bounded by a size of said substitution array;

transpositioning the transverse array by switching a position of each element with a position provided by an element of the key, the position provided by an element of the key is bounded by a size of said transverse array;

replacing each input byte transverse number of time with a value of the substitution array indexed with an input byte;

transpositioning the ciphertext by switching a position of each ciphertext element with a position provided by an element of the key, the position provided by an element of the key is bounded by a size of the block;

repeating the previous seven steps four times with the key elements being unique each time the key is accessed;

transpositioning each bit in the ciphertext block by switching a position of each ciphertext bit with a position provided by elements of the key, the position provided by elements of the key are bounded by the size of the blocks times eight; and repeating the previous nine steps four times with the key elements being unique each time the key is accessed.

29. A computer implemented method as defined in claim 28, wherein said key is the object key.

30. A computer implemented method as defined in claim 28, wherein the last transpositioning step uses a switch key comprised of the following steps:

initializing the switch key with elements of an initial state of the object key;

grouping the switch key by 32-bit blocks;

replacing the current switch key element with the following process:

performing a bit-wise exclusive or of the current switch key element to a switch key element indexed two elements from the current element;

rotating the output of the previous step to the right switch key indexed three elements from the current element modulus thirty-one plus one;

performing a bit-wise exclusive or of the output from the previous step to a switch key element indexed three elements from the current element;

repeating the previous three steps for each final transposition switch operation.

31. A computer implemented method as defined in claim 30, wherein a hashing function is included in the creation of the switch key.

32. A computer implemented method for encrypting data comprising the steps of:

creating at least one object key in a block cipher, the at least one object key comprising data and methods that operate on said data;

creating a key schedule based upon the at least one object key;

encrypting a block of input plaintext data utilizing said key schedule;

modifying the at least one object key using at least a non-linear function;

modifying the key schedule based upon the at least one modified object key;

encrypting a next block of input plaintext data utilizing said modified key schedule; and repeating the steps of modifying the at least one object key, modifying the key schedule and encrypting utilizing the modified key schedule until the encrypting of blocks of plaintext data is completed.

33. A computer implemented method as defined in claim 32, wherein the nonlinear function is a hashing function.

34. A cryptographic communications systems as defined in claim 23, wherein the non-linear function is a hashing function.

* * * * *

UNITED STATES PATENT AND TRADEMARK OFFICE
CERTIFICATE OF CORRECTION

PATENT NO. : 6,259,789 B1
DATED : July 10, 2001
INVENTOR(S) : Luciano F. Paone

It is certified that error appears in the above-identified patent and that said Letters Patent is hereby corrected as shown below:

Column 9,
Line 56, now reads "(PREV OUTPUT)"; should read -- (PREV_OUTPUT) --;
Lines 59 and 64, now reads "I_BYTE_OBJECT KEY"; should read
-- I_BYTE_OBJECT_KEY --;

Column 10,
Lines 13 and 25, now reads "I_INT_OBJECT KEY"; should read
-- I_INT_OBJECT_KEY --;

Column 11,
Line 3, now reads "attacks The authenticate"; should read -- attacks. The authenticate --;

Column 16,
Line 2, now reads "I_INT_OBJECT KEY"; should read -- I_INT_OBJECT_KEY --;
Line 10, now reads "rotatino PREV_OUTPUT"; should read -- rotating
PREV_OUTPUT --; and
Line 10, now reads "I_BYET_OBJECT"; should read -- I_BYTE_OBJECT --;

Signed and Sealed this

Twenty-sixth Day of March, 2002

Attest:

*Attesting Officer*

JAMES E. ROGAN
*Director of the United States Patent and Trademark Office*

(12) EX PARTE REEXAMINATION CERTIFICATE (7219th)
United States Patent
Paone

(10) Number: US 6,259,789 C1
(45) Certificate Issued: Dec. 8, 2009

(54) COMPUTER IMPLEMENTED SECRET OBJECT KEY BLOCK CIPHER ENCRYPTION AND DIGITAL SIGNATURE DEVICE AND METHOD

(75) Inventor: Luciano F. Paone, 40 Sunset Dr., Manhasset, NY (US) 11030

(73) Assignee: Luciano F. Paone, Manhasset, NY (US)

Reexamination Request:
No. 90/009,153, May 16, 2008

Reexamination Certificate for:
Patent No.: 6,259,789
Issued: Jul. 10, 2001
Appl. No.: 08/989,261
Filed: Dec. 12, 1997

(51) Int. Cl.
*H04L 9/32* (2006.01)
*H04L 9/06* (2006.01)

(52) U.S. Cl. .................... 380/28; 380/30; 713/189
(58) Field of Classification Search .................... None
See application file for complete search history.

(56) References Cited

U.S. PATENT DOCUMENTS

| 5,677,952 A | 10/1997 | Blakley, III et al. | |
| 5,841,872 A | 11/1998 | Colvin, Sr. ................. | 380/28 |

OTHER PUBLICATIONS

Bruce Schneier, "*Applied Cryptography: Protocols, Algorithms, and Source Code in C—2$^{nd}$ Edition*," John Wiley & Sons, Inc. (1996).

Carl H. Meyer & Stephen M. Matyas, *Cryptography: A New Dimension in Computer Data Security—A Guide for the Design and Implementation of Secure Systems*, John Wiley & Sons (1982).

National Bureau of Standards, Federal Information Processing Standards Publication 46–2, Data Encryption Standard (DES), Dec. 30, 1993, available at http://www.itl.nist.gov/fipspubs/fip46–2.htm.

C.J.A. Jansen & D.E. Boekee, Modes of Blockcipher Algorithms and Their Protection Against Active Eavesdropping, Lecture Notes in Computer Science: Advances in Cryptology—Eurocrypt '87 at 281–286 (Springer–Verlag 1987).

IEEE Std. 802.11–1997 Section 8.2 "The Wired Equivalent Privacy (WEP) algorithm".

Brian K. Dewey, Kernel–Level Implementation of an Encrypting File System (dated May 1996) B.S. thesis, College of William & Mary).

*Primary Examiner*—Matthew Heneghan

(57) ABSTRACT

A computer implemented method and device for creating object keys to be used with a 4096-bit secret key block cipher data encryption process and a 2048-bit secret key digital signature process. The object keys are dynamic keys, i.e., changing throughout the encryption process. The dynamic object keys are composed of a static initial state that is created by the user and a method that modifies the keys based on seeding from a random session key object. The object key modification is performed for each plaintext data block so that each data block is encrypted using a different key. The initial state of the object key is also used in a block cipher encryption process to encrypt a 512-bit random session key. Data blocks of 64 bytes each are encrypted utilizing a different key, provided by the object key, for each block. The ciphertext (encrypted file) is transmitted into a keyed hashed function that utilizes a 2048-bit object key to produce a unique 2048-bit digital signature that is appended to the ciphertext. The digital signature object key is seeded with the input data. Decryption is accomplished by reversing the encryption process.

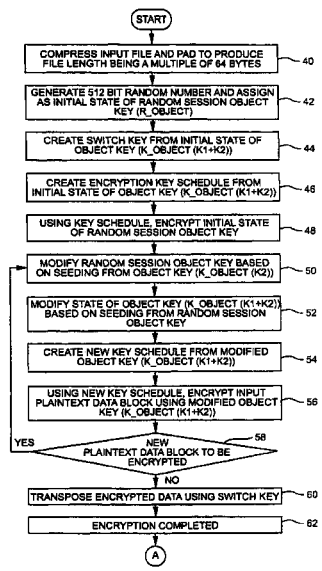

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 15, 24, 25, 33, and 34 is confirmed.

Claims 1, 3, 23, and 32 are cancelled.

Claims 4, 6, 8, 13, 14, and 26 are determined to be patentable as amended.

Claim 5 dependent on an amended claim, is determined to be patentable.

New claim 35 is added and determined to be patentable.

Claims 7, 9–12, 16–22, and 27–31 were not reexamined.

4. A computer implemented method as defined in claim [3] *35*, wherein the initial state of the random session object key is created by generating a random number.

6. A computer implemented method as defined in claim [3] *35*, wherein the method comprises two object keys utilized to produce the key schedule for each block of input plaintext.

8. A computer implemented method as defined in claim [1] *2*, wherein object key is dynamic and a modification method of said object key includes a hashing function.

13. A computer implemented method as defined in claim [3] *35*, wherein the modification method of said random session object key includes a hashing function.

14. A computer implemented method as defined in claim [3] *35*, wherein said object key is first initialized with the random session key object by using an initial current state of the random session key object to provide a key schedule in the modification method of the object key.

26. A cryptographic communications system as defined in claim [23] *24*, wherein the block cipher encryption/decryption process includes use of a keyed transposition of a sequence of intergers *and* provides a count of substitution rounds for a particular input entering an S-box.

*35. A computer implemented method as defined in claim 2, further comprising prior to the first step of encrypting the steps of:*

*creating an initial state of the at least one object key by the user;*

*creating an initial state of a random session object key; and*

*encrypting the initial state of random session object key in a block cipher encryption process with the initial state of the at least one object key.*

* * * * *

US006259789C2

(12) EX PARTE REEXAMINATION CERTIFICATE (7400th)

United States Patent
Paone

(10) Number: US 6,259,789 C2
(45) Certificate Issued: Mar. 9, 2010

(54) COMPUTER IMPLEMENTED SECRET OBJECT KEY BLOCK CIPHER ENCRYPTION AND DIGITAL SIGNATURE DEVICE AND METHOD

(75) Inventor: Luciano F. Paone, 40 Sunset Dr., Manhasset, NY (US) 11030

(73) Assignee: Luciano F. Paone, Manhasset, NY (US)

Reexamination Request:
No. 90/009,507, Jun. 29, 2009

Reexamination Certificate for:
Patent No.: 6,259,789
Issued: Jul. 10, 2001
Appl. No.: 08/989,261
Filed: Dec. 12, 1997

Reexamination Certificate C1 6,259,789 issued Dec. 8, 2009

Certificate of Correction issued Mar. 26, 2002.

(51) Int. Cl.
H04L 9/32 (2006.01)
H04L 9/06 (2006.01)

(52) U.S. Cl. ............................. 380/28; 380/30; 713/189
(58) Field of Classification Search ........................ None
See application file for complete search history.

(56) References Cited

U.S. PATENT DOCUMENTS 5,841,872 A * 11/1998 Colvin, Sr. .................. 380/28

OTHER PUBLICATIONS

Carl H. Meyer & Stephen M. Matyas, "Cryptography." A New Dimension in Computer Data Security—A Guide for the Design and Implementation of Secure Systems, John Wiley & Sons (1982).*

Bruce Schneier, "Applied Cryptography: Protocols, Algorithms, and Source Code in C—2nd Edition," John Wiley & Sons, Inc. (1996).*

* cited by examiner

*Primary Examiner*—Deandra M Hughes

(57) ABSTRACT

A computer implemented method and device for creating object keys to be used with a 4096-bit secret key block cipher data encryption process and a 2048-bit secret key digital signature process. The object keys are dynamic keys, i.e., changing throughout the encryption process. The dynamic object keys are composed of a static initial state that is created by the user and a method that modifies the keys based on seeding from a random session key object. The object key modification is performed for each plaintext data block so that each data block is encrypted using a different key. The initial state of the object key is also used in a block cipher encryption process to encrypt a 512-bit random session key. Data blocks of 64 bytes each are encrypted utilizing a different key, provided by the object key, for each block. The ciphertext (encrypted file) is transmitted into a keyed hashed function that utilizes a 2048-bit object key to produce a unique 2048-bit digital signature that is appended to the ciphertext. The digital signature object key is seeded with the input data. Decryption is accomplished by reversing the encryption process.

At the time of issuance and publication of this certificate, the patent remains subject to pending reexamination control number 90/009,543 filed Jul. 27, 2009. The claim content of the patent may be subsequently revised if a reexamination certificate issues from the reexamination proceeding.

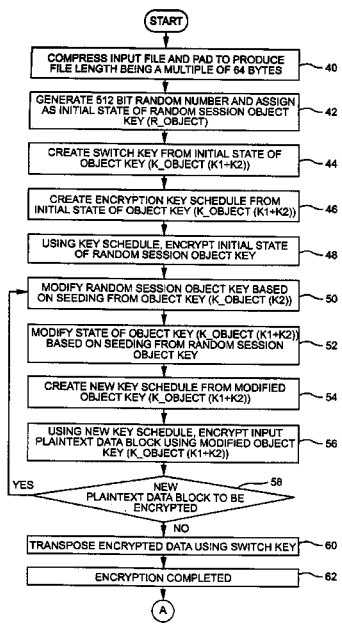

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 17 and 26 is confirmed.

Claims 1, 3, 23 and 32 were previously cancelled.

* * * * *

US006259789C3

(12) EX PARTE REEXAMINATION CERTIFICATE (7557th)
United States Patent
Paone

(10) Number: US 6,259,789 C3
(45) Certificate Issued: Jun. 8, 2010

(54) COMPUTER IMPLEMENTED SECRET OBJECT KEY BLOCK CIPHER ENCRYPTION AND DIGITAL SIGNATURE DEVICE AND METHOD

(75) Inventor: Luciano F. Paone, 40 Sunset Dr., Manhasset, NY (US) 11030

(73) Assignee: Luciano F. Paone, Manhasset, NY (US)

Reexamination Request:
No. 90/009,543, Jul. 27, 2009

Reexamination Certificate for:
Patent No.: 6,259,789
Issued: Jul. 10, 2001
Appl. No.: 08/989,261
Filed: Dec. 12, 1997

Reexamination Certificate C1 6,259,789 issued Dec. 8, 2009

Reexamination Certificate C2 6,259,789 issued Mar. 9, 2010

Certificate of Correction issued Mar. 26, 2002.

(51) Int. Cl.
*H04L 9/32* (2006.01)
*H04L 9/06* (2006.01)

(52) U.S. Cl. .............................. 380/28; 380/30; 713/189
(58) Field of Classification Search ........................ None
See application file for complete search history.

(56) References Cited
U.S. PATENT DOCUMENTS
5,841,872 A 11/1998 Colvin, Sr. ................... 380/28

OTHER PUBLICATIONS

Bruce Schneier, "Applied Cryptography: Protocols, Algorithms, and Source Code in C–$2^{nd}$ Edition," John Wiley & Sons, Inc. (1996).
Carl H. Meyer & Stephen M. Matyas, Cryptography: A New Dimension in Computer Data Security—A Guide for the Design and Implementation of Secure Systems, John Wiley & Sons (1982).

(Continued)

*Primary Examiner*—Deandra M Hughes

(57) ABSTRACT

A computer implemented method and device for creating object keys to be used with 4096-bit secret key block cipher data encryption process and a 2048-bit secret key digital signature process. The object keys are dynamics keys, i.e., changing throughout the encryption process. The dynamic object keys are composed of a static initial state that is created by the user and a method that modifies the keys based on seeding from a random session key object. The object key modification is performed for each plaintext data block so that each data block is encrypted using a different key. The initial state of the object key is also used in a block cipher encryption process to encrypt a 512-bit random session key. Data blocks of 64 bytes each are encrypted utilizing a different key, provided by the object key, for each block. The ciphertext (encrypted file) is transmitted into a keyed hashed function that utilizes a 2048-bit object key to produce a unique 2048-bit digital signature that is appended to the ciphertext. The digital signature object key is seeded with the input data. Decryption is accomplished by reversing the encryption process.

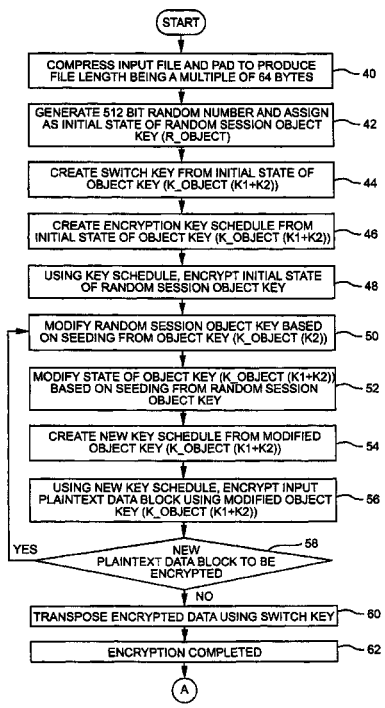

OTHER PUBLICATIONS

Eli Biham & Adi Shamir, "Differential Cryptanalysis of DES–like Cryptosystems," Advances in Cryptology—CRYPTO '90, LNCS 537, pp. 2–21, Springer–Verlag Berlin Heidelberg (1991).

Selim G. Akl, "On the Security of Compressed Encodings," Advances in Cryptography Prceedings of Crypto '83, reprinted by Springer–Verlag in 1996 (1983).

Bart Preneel, "Cryptographic Hash Functions," Proceedings of the 3$^{rd}$ Symposium on State and Progress of Research in Cryptography, pp. 161–171 (1993).

Yuliang Zheng, Josef Pieprzyk, Jennifer Seberry, "Haval—A One—Way Hashing Algorithm with Variable Length of Output," Centre for Computer Security Research, Department of Computer Science, University of Wollongong (Nov. 2, 1993).

Antoon Bosselaers, Rene Govaerts, & Joos Vandewalle, "Fast Hashing on the Pentium," Advances in Cryptology—CRYPTO 1996, Lecture Notes in Computer Science 1109, Springer–Verlag, pp. 298–312 (1996).

M.J.B. Robshaw, "On Recent Results for MD2, MD4 and MD5," RSA Laboratories' Bulletin No. 4 (Nov. 12, ,1996).

Alfred J. Menezes, Paul C. van Oorschot, & Scott A. Vanston, "Handbook of Applied Cryptography," CRC Press LLC (1997).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2, 24–26, 33 and 34 is confirmed.

Claims 1, 3, 23 and 32 was previously cancelled.

Claims 4–22, 27–31 and 35 were not reexamined.

\* \* \* \* \*